(12) United States Patent
Fujita

(10) Patent No.: US 10,406,918 B2
(45) Date of Patent: Sep. 10, 2019

(54) DISPLAY DEVICE

(71) Applicant: Yazaki Corporation, Tokyo (JP)

(72) Inventor: Sunao Fujita, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 171 days.

(21) Appl. No.: 15/359,837

(22) Filed: Nov. 23, 2016

(65) Prior Publication Data

US 2017/0072800 A1 Mar. 16, 2017

Related U.S. Application Data

(63) Continuation of application No. PCT/JP2015/065268, filed on May 27, 2015.

(30) Foreign Application Priority Data

May 28, 2014 (JP) .................................. 2014-110272

(51) Int. Cl.
*B60K 35/00* (2006.01)
*G09F 9/00* (2006.01)
(Continued)

(52) U.S. Cl.
CPC .............. *B60K 35/00* (2013.01); *B60K 37/06* (2013.01); *G01D 7/06* (2013.01); *G09F 9/00* (2013.01);
(Continued)

(58) Field of Classification Search
CPC ................................ B60K 35/00; B60K 37/06; B60K 2350/1028; B60K 2350/2039;
(Continued)

(56) References Cited

U.S. PATENT DOCUMENTS

| 4,371,870 A | 2/1983 | Biferno |
| 5,537,236 A | 7/1996 | Young |

(Continued)

FOREIGN PATENT DOCUMENTS

| DE | 102005059092 A1 | 6/2007 |
| JP | 05-319138 A | 12/1993 |

(Continued)

OTHER PUBLICATIONS

Takashi, et.al., "Vehicle Meter", JP2011-64480A, machine translation.*

(Continued)

*Primary Examiner* — Wen Huang
(74) *Attorney, Agent, or Firm* — Sughrue Mion, PLLC

(57) ABSTRACT

A display device includes an image display device that includes an image display surface that emits light polarized in one direction and displays an image; and a superimposing display device that includes a transparent light guide plate that is provided overlapping the image display surface, transmits the light emitted from the image display device, and also has grooves constituting a pattern formed thereon, includes a light source that irradiates an end surface of the transparent light guide plate with light, and is switched between display and non-display of the pattern based on lighting and non-lighting of the light source. A polarization direction of the image display device and an extending direction of the grooves intersect at an angle range of 75° to 105°. Accordingly, the display device can ensure proper visibility.

18 Claims, 17 Drawing Sheets

(51) Int. Cl.
*B60K 37/06* (2006.01)
*G09F 13/00* (2006.01)
*G01D 7/06* (2006.01)

(52) U.S. Cl.
CPC ...... *G09F 13/00* (2013.01); *B60K 2370/1438* (2019.05); *B60K 2370/20* (2019.05); *B60K 2370/34* (2019.05); *B60K 2370/347* (2019.05); *B60K 2370/46* (2019.05); *B60K 2370/693* (2019.05); *B60K 2370/81* (2019.05); *B60K 2370/828* (2019.05); *B60K 2370/834* (2019.05)

(58) Field of Classification Search
CPC ...... B60K 2350/2056; B60K 2350/206; B60K 2350/2086; B60K 2350/307; B60K 2350/945; B60K 2350/946; B60K 2350/948; G01D 7/00; G01D 11/28; G09F 9/00; G09F 13/00; G09F 13/18
USPC .................................................... 359/489.08
See application file for complete search history.

(56) References Cited

U.S. PATENT DOCUMENTS

| | | |
|---|---|---|
| 5,963,280 A | 10/1999 | Okuda et al. |
| 6,144,424 A | 11/2000 | Okuda et al. |
| 2006/0083476 A1 | 4/2006 | Winkler |
| 2007/0247295 A1 | 10/2007 | Donath et al. |
| 2008/0291695 A1 | 11/2008 | Okayasu et al. |
| 2015/0172631 A1* | 6/2015 | Kasahara ............ H04N 5/3572 348/46 |

FOREIGN PATENT DOCUMENTS

| | | |
|---|---|---|
| JP | 09-330609 A | 12/1997 |
| JP | 2006-003431 A | 1/2006 |
| JP | 2006-184881 A | 7/2006 |
| JP | 2011-064480 A | 3/2011 |
| JP | 2012-032286 A | 2/2012 |
| JP | 2013079877 A | 5/2013 |

OTHER PUBLICATIONS

Communication dated Mar. 22, 2018, issued by the German Patent and Trademark Office in counterpart German Application No. 112015002460.3.
Communication dated Dec. 5, 2017, from the Japanese Patent Office in counterpart application No. 2016-523535.
Communication dated Jun. 5, 2018 from the Japanese Patent Office in counterpart Application No. 2016-523535.
Written Opinion of the International Searching Authority of PCT/JP2015/065268 dated Sep. 1, 2015.
International Search Report of PCT/JP2015/065268 dated Sep. 1, 2015.

* cited by examiner

DISPLAY DEVICE

CROSS-REFERENCE TO RELATED APPLICATION

This application is a continuation application of International Application PCT/JP2015/065268, filed on May 27, 2015, and designating the U.S., the entire contents of which are incorporated herein by reference.

BACKGROUND OF THE INVENTION

1. Field of the Invention

The present invention relates to a display device.

2. Description of the Related Art

As a conventional display device that is fitted to a vehicle and the like, Japanese Patent Application Laid-open No. 2012-032286, for example, discloses a display device that includes a first display unit that displays instruments of the vehicle and a second display unit that displays additional information. The second display unit of the display device is arranged with a plurality of colorless transparent light guide plates in an overlapping manner on the face of a dial of the first display unit, and on the light guide plates, patterns are formed with grooves. In such a display device, as a technology to illuminate and display a certain display pattern as needed, a technology disclosed in Japanese Patent Application Laid-open No. 2006-003431 is available, for example.

In such a display device, to achieve a wider variety of display, there is a case of performing a variety of display on the first display unit described in the above-described Japanese Patent Application Laid-open No. 2012-032286, and on a liquid crystal display and the like, for example. In the conventional display device, the grooves forming the patterns in the second display unit may be visually recognized even when the second display unit is in a state of non-display. Consequently, this may cause the visibility of the display on the first display unit and the liquid crystal display to be disturbed.

SUMMARY OF THE INVENTION

The present invention has been made in view of the above-mentioned circumstances, and an object of the invention is to provide a display device that can ensure proper visibility.

To achieve the above-described objective, a display device according to one aspect of the present invention includes an image display device that includes an image display surface that is configured to emit light polarized in one direction and display an image; and a superimposing display device that includes a transparent light guide plate that is configured to be provided overlapping the image display surface, transmit the light emitted from the image display device, and have grooves constituting a pattern formed thereon, includes a light source for grooves that irradiate an end surface of the transparent light guide plate with light, and is switched between display and non-display of the pattern based on lighting and non-lighting of the light source for grooves, wherein a polarization direction of the image display device and an extending direction of the grooves intersect at an angle range of 75° to 105°.

According to another aspect of the present invention, in the display device, the polarization direction of the image display device and the extending direction of the grooves may be orthogonal to each other.

According to still another aspect of the present invention, in the display device, the extending direction of the grooves and an irradiation direction of light by the light source for grooves may be orthogonal to each other.

According to still another aspect of the present invention, in the display device, the polarization direction of the image display device and the irradiation direction of the light by the light source for grooves may be directions along a vertical direction, the extending direction of the grooves may be a direction along a horizontal direction, the transparent light guide plate may be formed such that a length in the horizontal direction is larger than the length in the vertical direction, and the light source for grooves may be arranged on a lower side in the vertical direction of the transparent light guide plate or on an upper side in the vertical direction of the transparent light guide plate.

According to still another aspect of the present invention, in the display device, the image display device may include a first display surface that constitutes the image display surface and display the image concerning vehicle information by light emitted from a main light source and a polarizing plate that is configured to polarize light into light polarized in one direction, the superimposing display device may include a second display surface that is provided overlapping the first display surface and transmits light, and has the grooves constituting the pattern formed thereon and be capable of switching between a display state of displaying the pattern by the light emitted from the light source for grooves and a non-display state of not displaying the pattern by putting out the light source for grooves, the polarizing plate may be provided between the main light source and the second display surface and change light emitted toward the second display surface from the main light source into light polarized in one direction, and the polarization direction of the light polarized by the polarizing plate and the extending direction of the grooves may intersect at the angle range of 75° to 105°.

According to still another aspect of the present invention, a display device includes a first display surface that displays vehicle information by light emitted from a main light source; a second display surface that is configured to be provided overlapping the first display surface and transmit light, and have grooves constituting a pattern formed thereon and is capable of switching between a display state of displaying the pattern by light emitted from a light source for grooves and a non-display state of not displaying the pattern by putting out the light source for grooves; and a polarizing plate that is provided between the main light source and the second display surface and is configured to change light emitted toward the second display surface from the main light source into light polarized in one direction, wherein a polarization direction of the light polarized by the polarizing plate and an extending direction of the grooves intersect.

According to still another aspect of the present invention, in the display device, the polarization direction of the light polarized by the polarizing plate and the extending direction of the grooves may intersect at an angle range of 75° to 105°.

According to still another aspect of the present invention, in the display device, the polarization direction of the light polarized by the polarizing plate and the extending direction of the grooves may be orthogonal to each other.

According to still another aspect of the present invention, in the display device, the first display surface may display an image concerning the vehicle information by the light emitted from the main light source.

According to still another aspect of the present invention, in the display device, the first display surface may display the vehicle information by transmitting the light emitted from the main light source in a certain shape.

According to still another aspect of the present invention, in the display device, the first display surface may include, as the certain shape, an indicator portion that transmits light emitted from the main light source and is pointed by a pointer rotated by a rotating shaft, or a notification symbol that transmits light emitted from the main light source and for which the display and non-display are switched on the basis of the lighting and non-lighting of the main light source.

According to still another aspect of the present invention, in the display device, the grooves each may have a bottom portion forming an angle by a first groove forming surface that lies along the extending direction and a second groove forming surface that lies along the extending direction and is connected to the first groove forming surface, the light source for grooves may be located on the first groove forming surface side, a surface on which the grooves are formed may be opposite to the first display surface, and when an angle, in a cross-sectional view orthogonal to the extending direction, that is formed by a normal line of the surface, on which the groove is formed, and the first groove forming surface and located on the first display surface side and an opposite side of the second groove forming surface side is defined as a first groove-forming surface angle, and when an angle, in the cross-sectional view orthogonal to the extending direction, that is formed by the normal line and the second groove forming surface and located on the first display surface side and the opposite side of the first groove forming surface side is defined as a second groove-forming surface angle, the first groove-forming surface angle may be greater than the second groove-forming surface angle.

According to still another aspect of the present invention, in the display device, a member on which the grooves are formed may emit light that was not reflected at the grooves via an end surface that is opposite to an incident end surface on which the light from the light source for grooves is incident in the irradiation direction of the light by the light source for grooves out of the light that has entered from the incident end surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail exemplary embodiments according to the present invention based on the accompanying drawings. The invention, however, is not intended to be limited by the embodiments. The components in the following embodiments include those that are simple and substitutable by the person skilled in the art, or those that are substantially the same.

First Embodiment

Figure 1:
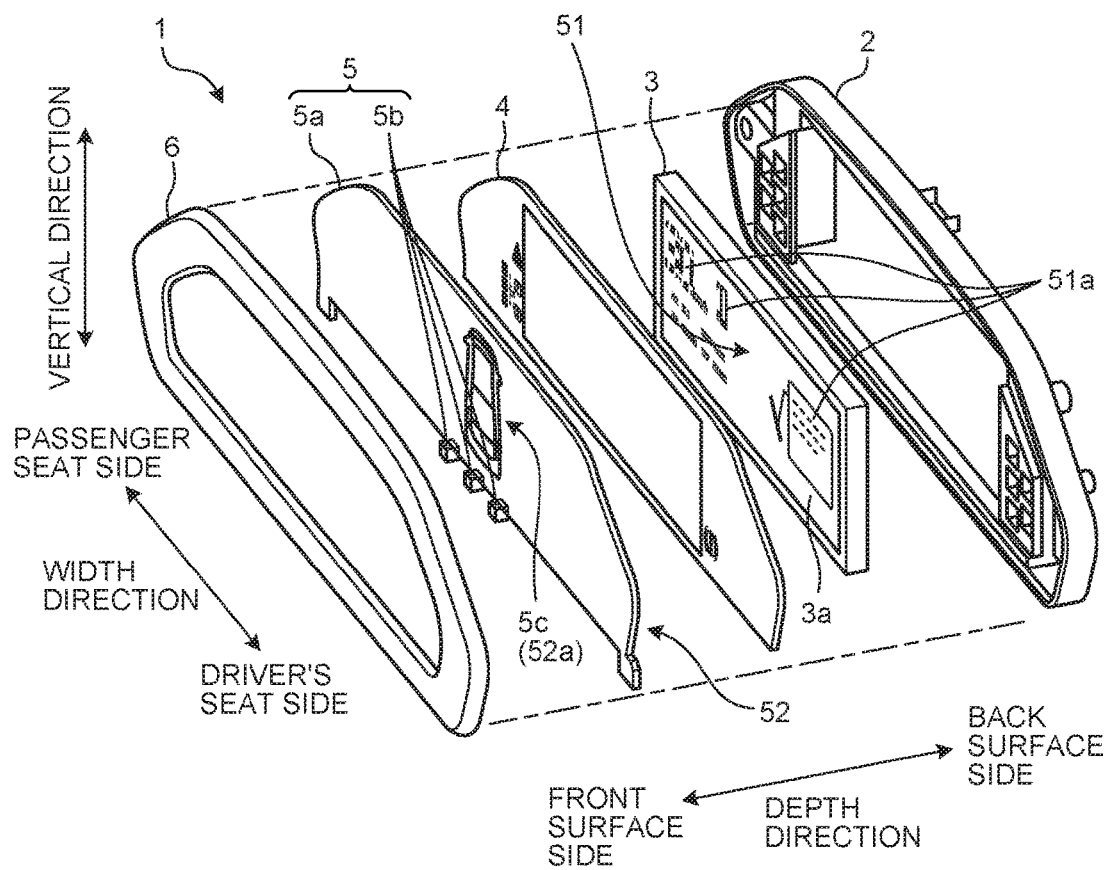
FIG. 1 is an exploded perspective view illustrating a schematic configuration of a display device according to a first embodiment.
Figure 2:
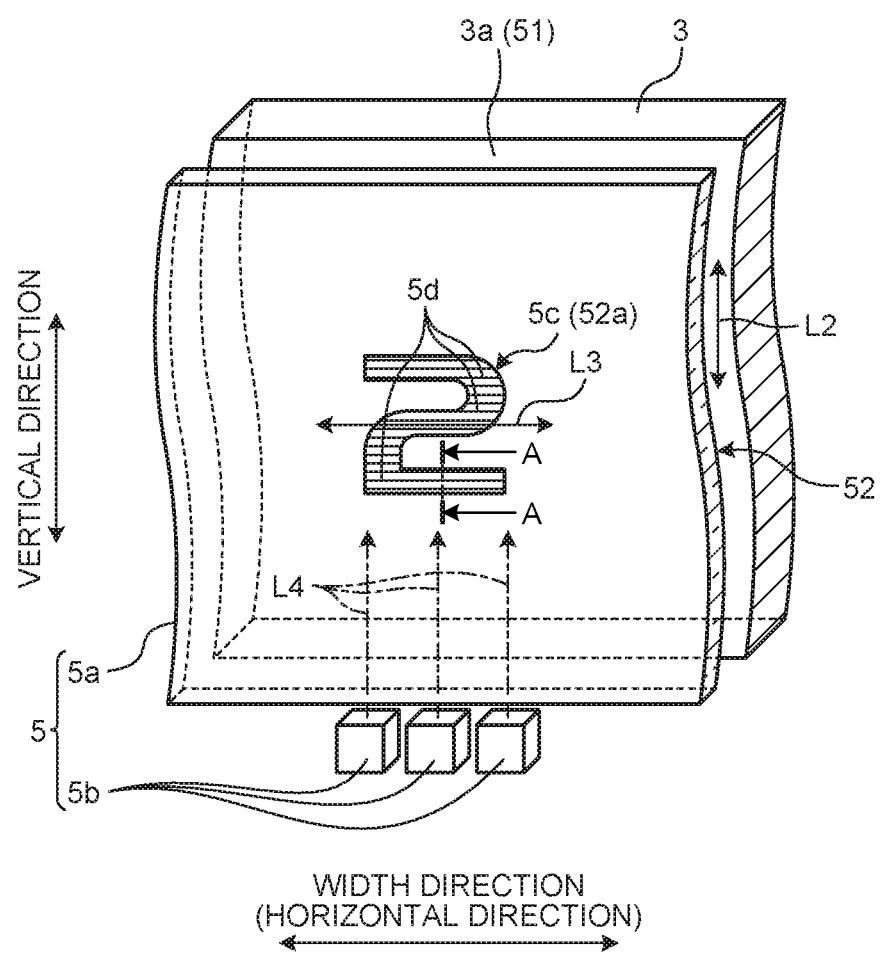
FIG. 2 is a schematic perspective view illustrating a schematic configuration of a superimposing display device of the display device in the first embodiment.
Figure 3:
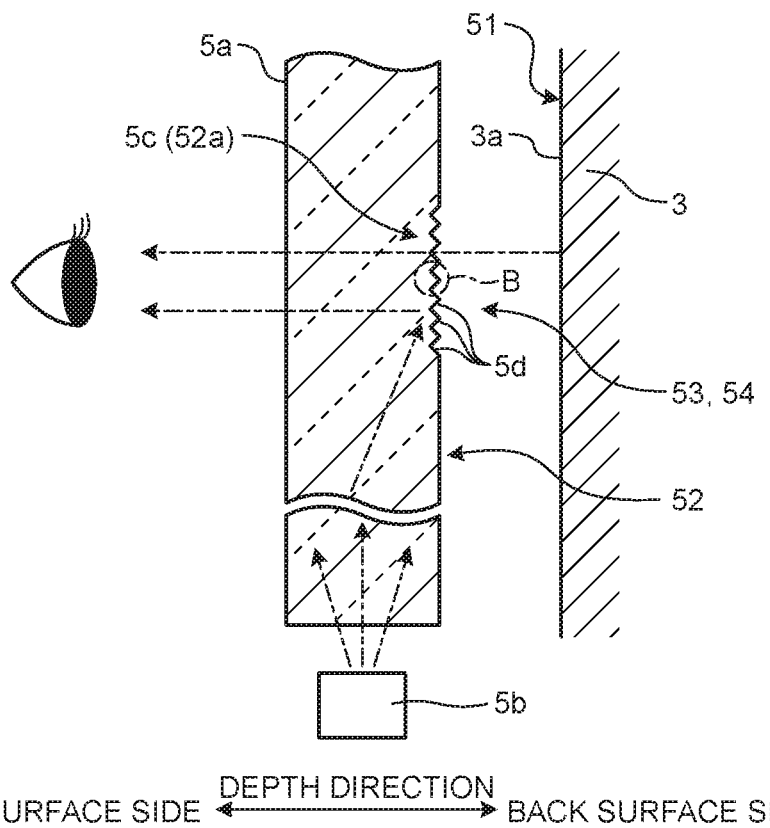
FIG. 3 is a schematic cross-sectional view along the line A-A in FIG. 2.
Figure 4:
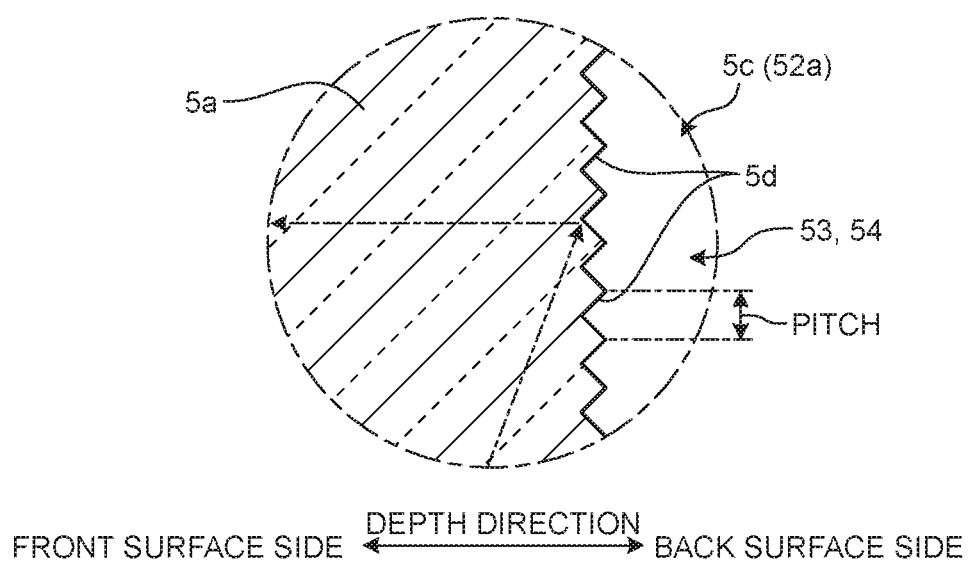
FIG. 4 is a partial cross-sectional view of the inside of an enclosing line B in FIG. 3.
Figure 5:
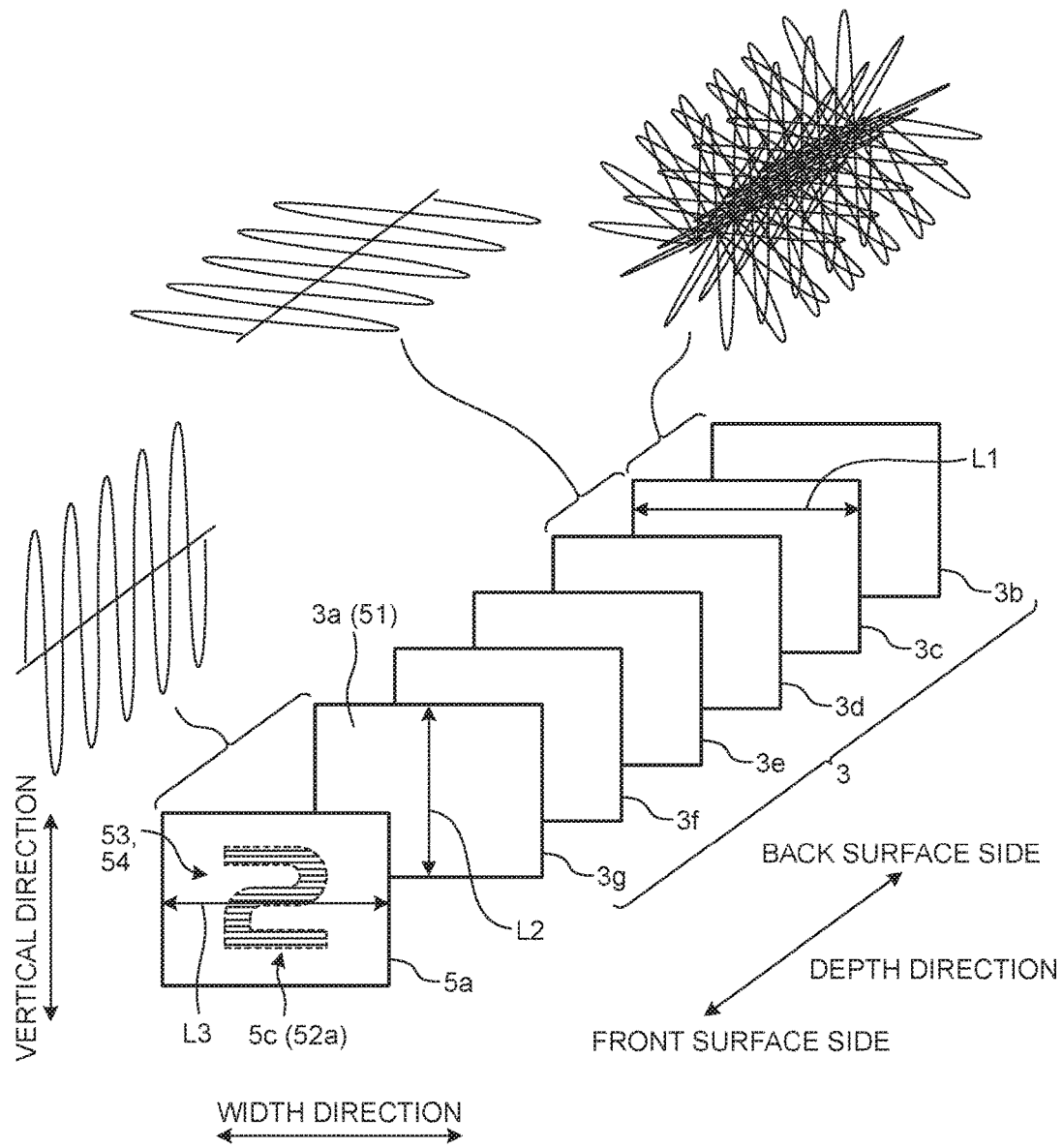
FIG. 5 is a schematic exploded perspective view illustrating a schematic configuration of a display of the display device in the first embodiment.
Figure 6:
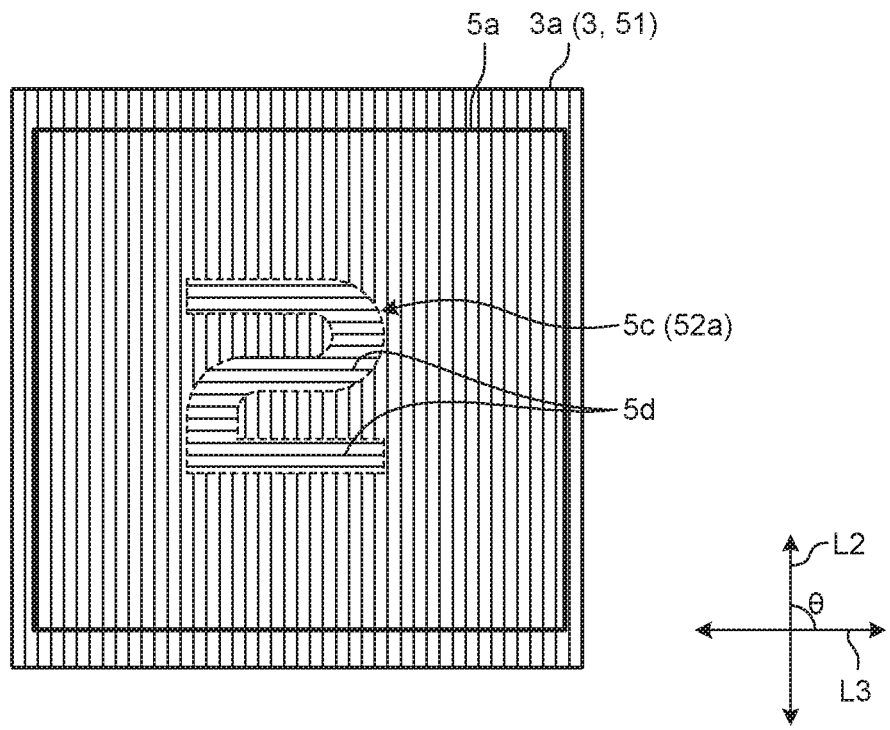
FIG. 6 is a schematic front view of an image display surface and a transparent light guide plate when a polarization direction of the display and an extending direction of grooves are orthogonal to each other.
Figure 7:
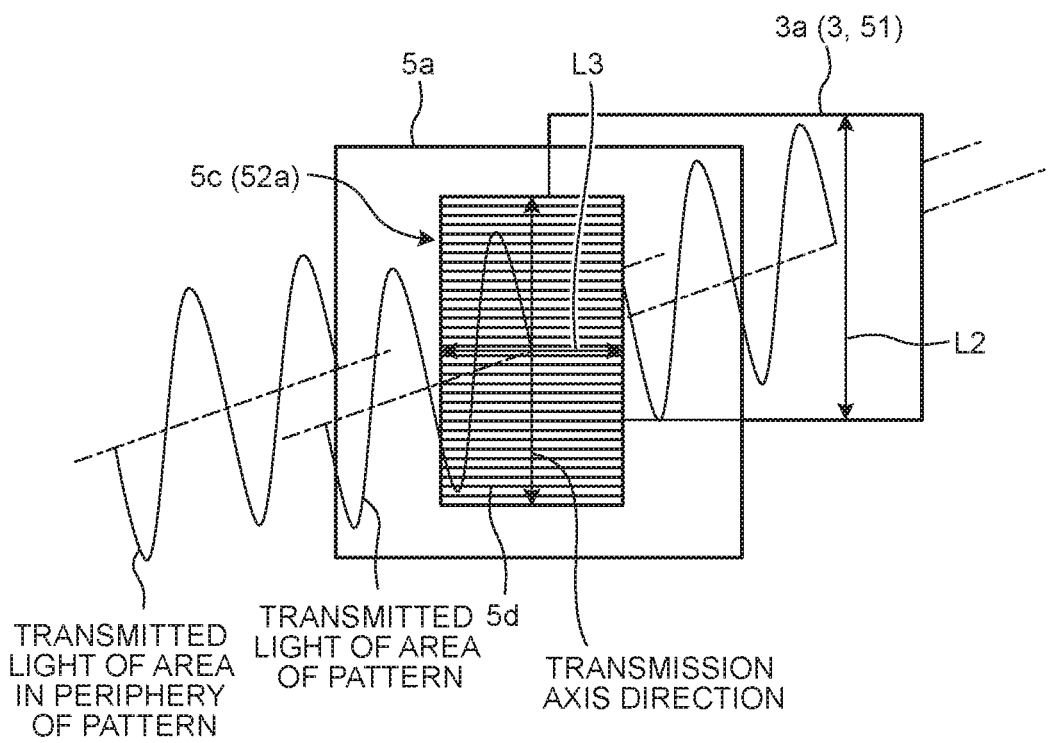
FIG. 7 is a schematic diagram for explaining the operation when the polarization direction of the display and the extending direction of the grooves are orthogonal to each other.
Figure 8:
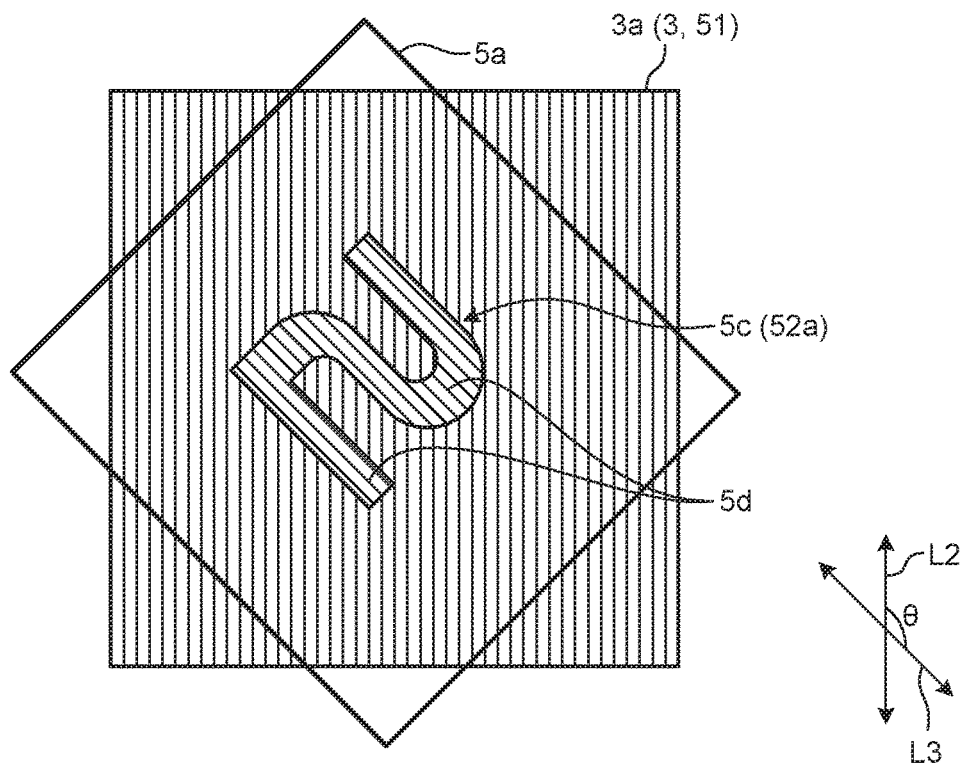
FIG. 8 is a schematic front view of the image display surface and the transparent light guide plate when the polarization direction of the display and the extending direction of the grooves intersect at a certain angle.
Figure 9:
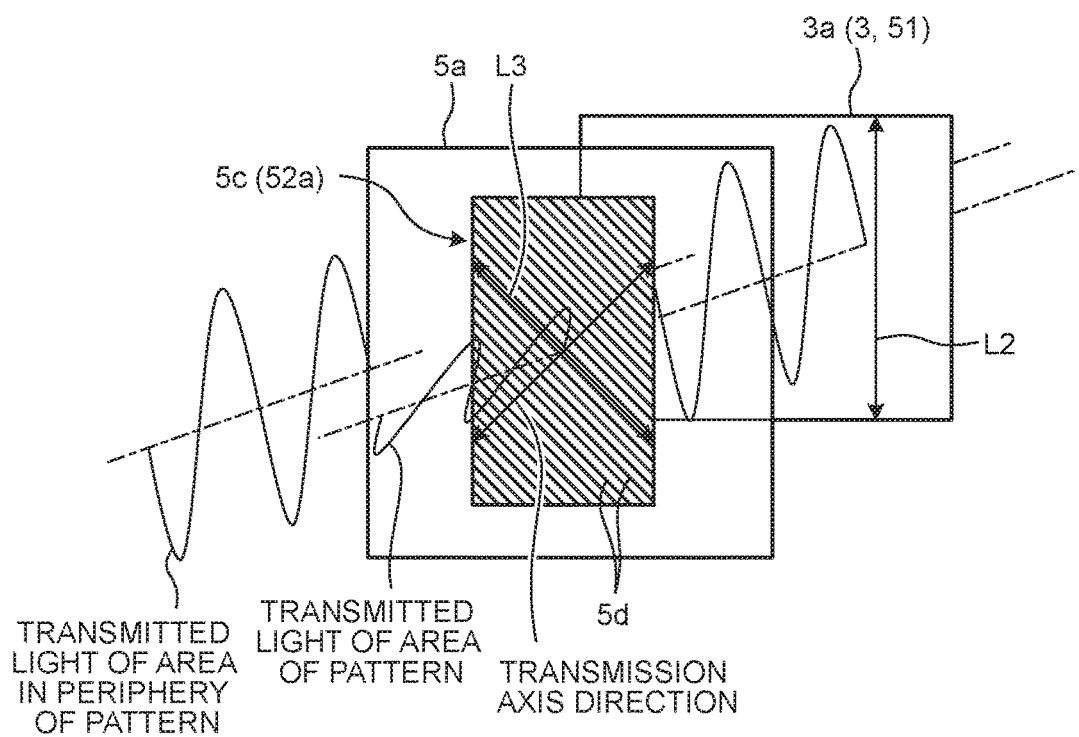
FIG. 9 is schematic diagram for explaining the operation when the polarization direction of the display and the extending direction of the grooves intersect at a certain angle.
Figure 10:
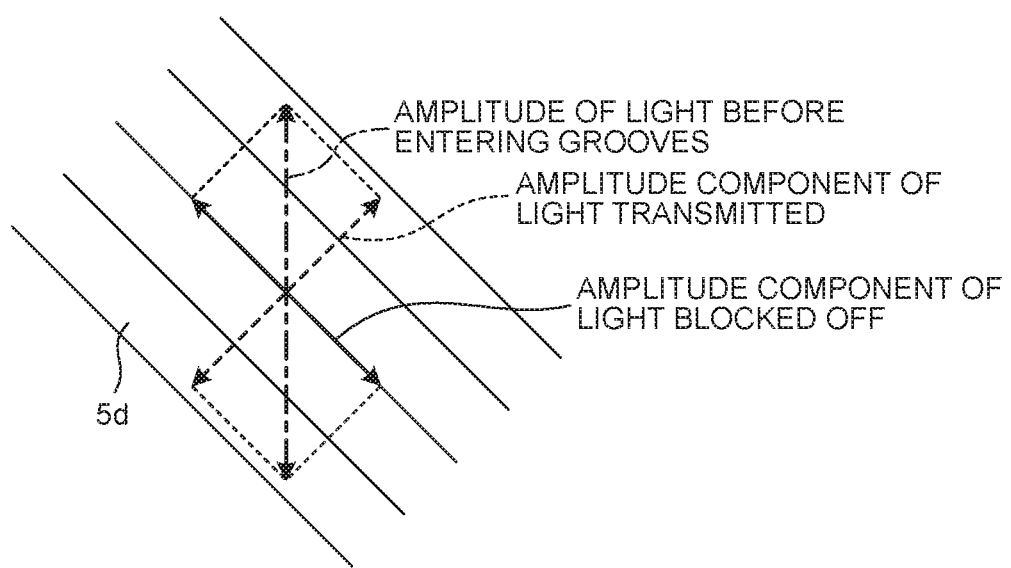
FIG. 10 is a schematic diagram for explaining the operation when the polarization direction of the display and the extending direction of the grooves intersect at a certain angle.
Figure 11:
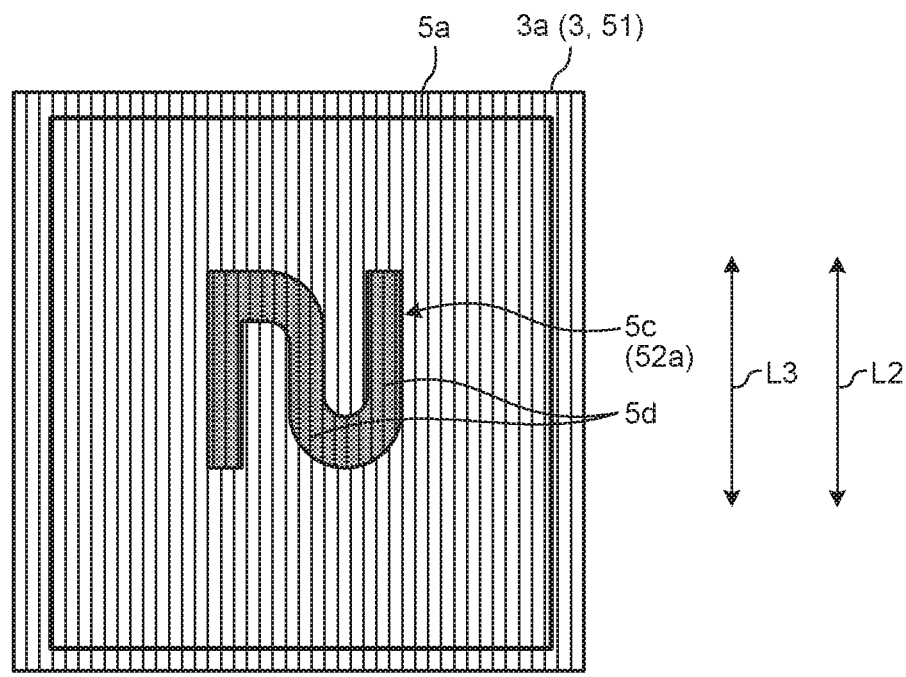
FIG. 11 is a schematic front view of the image display surface and the transparent light guide plate when the polarization direction of the display and the extending direction of the grooves are in parallel.
Figure 12:
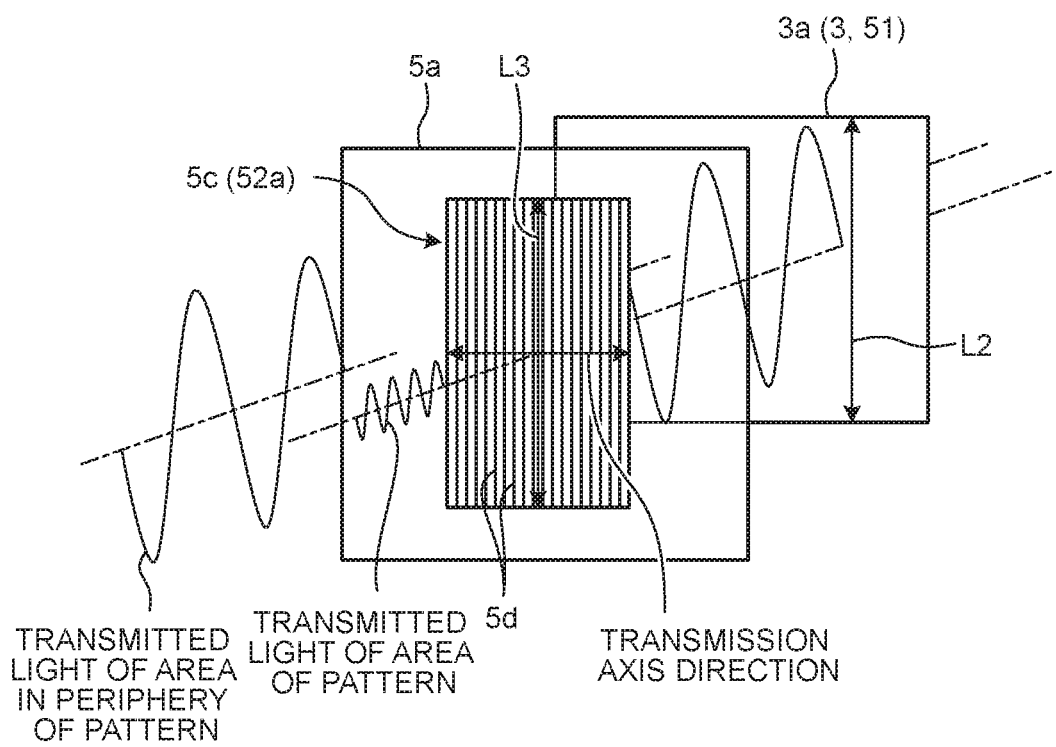
FIG. 12 is a schematic diagram for explaining the operation when the polarization direction of the display and the extending direction of the grooves are in parallel.

FIG. 1 is an exploded perspective view illustrating a schematic configuration of a display device according to a first embodiment. FIG. 2 is a schematic perspective view illustrating a schematic configuration of a superimposing display device of the display device in the first embodiment. FIG. 3 is a schematic cross-sectional view along the line A-A in FIG. 2. FIG. 4 is a partial cross-sectional view of the inside of an enclosing line B in FIG. 3. FIG. 5 is a schematic exploded perspective view illustrating a schematic configuration of a display of the display device in the first embodiment. FIG. 6 is a schematic front view of an image display surface and a transparent light guide plate when a polarization direction of the display and an extending direction of grooves are orthogonal to each other. FIG. 7 is a schematic diagram for explaining the operation when the polarization direction of the display and the extending direction of the grooves are orthogonal to each other. FIG. 8 is a schematic front view of the image display surface and the transparent light guide plate when the polarization direction of the display and the extending direction of the grooves intersect at a certain angle. FIGS. 9 and 10 are schematic diagrams for explaining the operation when the polarization direction of the display and the extending direction of the grooves intersect at a certain angle. FIG. 11 is a schematic front view of the image display surface and the transparent light guide plate when the polarization direction of the display and the extending direction of the grooves are in parallel. FIG. 12 is a schematic diagram for explaining the operation when the polarization direction of the display and the extending direction of the grooves are in parallel.

A display device 1 in the first embodiment, as illustrated in FIG. 1, is to compose what are called meters, is mounted on an instrument panel provided on a dashboard of a vehicle such as an automobile, and displays a variety of information provided for driving the vehicle, for example. Note that a width direction of the display device 1 illustrated in FIG. 1 corresponds, typically, to a vehicle width direction of the vehicle to which the display device 1 is applied. In the width direction of the display device 1, one side (near side in FIG. 1) facing the front surface of the display device 1 corresponds to the driver's seat side of the vehicle, and the other side (far side in FIG. 1) facing the front surface of the display device 1 corresponds to the passenger seat side of the vehicle. However, they may be reversed. Furthermore, a depth direction of the display device 1 illustrated in FIG. 1 is, typically, equivalent to a front-and-rear direction of the vehicle (in other words, a vehicle travel direction) to which the display device 1 is applied. The front surface side of the display device 1 is the side facing the driver's seat of the vehicle, and typically, is the side viewed by a driver who sits in the driver's seat. Meanwhile, the back surface side of the display device 1 is an opposite side to the front surface side in the depth direction, and typically, is the side accommodated in the inside of the instrument panel.

Specifically, the display device 1 includes a housing 2, a display 3 that serves as an image display device, a dial plate 4, a superimposing display device 5, and a facing plate 6. The display device 1 is structured being stacked, toward the front surface side from the back surface side in the depth direction, with and in order of the housing 2, the display 3, the dial plate 4, the superimposing display device 5, and the facing plate 6.

The housing 2 constitutes a case in which various components composing the display device 1 are assembled and are accommodated.

The display 3 is driven and controlled via a control device and the like, and displays various images on an image display surface 3a. The display 3 is a display unit located on the back surface side in the depth direction in the display device 1 of a two-layer type, and constitutes the first layer (a later-described first display surface 51) of display surfaces that displays vehicle information. As for the display 3, a thin liquid crystal display can be used, for example. However, it is not limited thereto, and a plasma display, an organic EL display, and others can also be used. As for the image displayed on the image display surface 3a, in addition to information concerning the speed and eco-driving of the vehicle, a variety of driving information concerning the driving, which varies every moment during the driving of the vehicle, such as an integrated travel distance, cooling water temperature, an output rotation speed of a driving power source, remaining fuel, a battery charge amount, and others may be included, for example.

The dial plate 4 is a plate-like member on which various symbols, characters, figures, and others that correspond to various warning lights (warning lamps, what are called telltales), a shift position indicator, direction indicator symbols, and others are drawn. The dial plate 4 is irradiated with light from the back surface side, and by the irradiated light being transmitted through the portions of the drawn symbols, characters, figures, and others, the symbols, characters, figures, and others are displayed being turned on.

In the above-described display 3, the surface of the front surface side thereof is exposed from the dial plate 4, and the surface of the front surface side of the display 3 constitutes the image display surface 3a. The image display surface 3a constitutes the first display surface 51 that displays a real image (image) 51a concerning the vehicle information by the light emitted from a backlight 3b (see FIG. 5) that serves as a later-described main light source. The vehicle information includes the above-described various driving information that concerns the driving such as the vehicle condition and traveling status of the vehicle on which the display device 1 is mounted. The first display surface 51, by displaying these pieces of information as the real image 51a, presents them to the driver and the like. The first display surface 51, when in an on-state, is in a state of being capable of displaying the real image 51a, and when in an off-state, the real image 51a is not displayed.

The superimposing display device 5 is a display unit located on the front surface side in the depth direction in the display device 1 of a two-layer type, and constitutes the second layer (a later-described second display surface 52) of the display surfaces that displays a certain pattern. The superimposing display device 5, as illustrated in FIGS. 1, 2, 3, and 4, includes a transparent light guide plate 5a, and light sources 5b that serve as a light source for grooves. The transparent light guide plate 5a is provided in an overlapping manner on the front surface side of the image display surface 3a. The transparent light guide plate 5a is formed by a transparent member (transparent medium) having transparency that transmits the light emitted from the display 3. On the transparent light guide plate 5a, fine grooves 5d that constitute a pattern (display design) 5c are formed. The grooves 5d constituting the pattern 5c may be formed to be in recessed shapes on a principal surface of the transparent light guide plate 5a, that is, the principal surface of the back surface side of the transparent light guide plate 5a, by resin-molding the transparent light guide plate 5a by using a mold having projecting shapes corresponding to the grooves 5d, for example. Furthermore, the grooves 5d constituting the pattern 5c may be formed to be in recessed shapes on the principal surface of the transparent light guide plate 5a, that is, the principal surface of the back surface side of the transparent light guide plate 5a, by engraving in various methods such as laser beam machining, for example. As for the pattern 5c formed by the grooves 5d on the transparent light guide plate 5a, various patterns such as those related to the driving information displayed on the display 3 may be included, for example. In the example in FIG. 1, the pattern 5c is a "vehicle symbol (icon) imitating the vehicle," and in the example in FIG. 2 and others, the pattern 5c is numeral "2," for example. However, it is not limited thereto. The light sources 5b irradiate the end surface of the transparent light guide plate 5a with light. The light sources 5b are composed of light emitting diode (LED) elements, for example. However, they are not limited thereto. The light sources 5b are arranged so that the optical axis direction thereof is orthogonal to an end surface of the transparent light guide plate 5a and so that the irradiated light enters from the end surface of the transparent light guide plate 5a. The extending direction of the grooves 5d and the irradiating direction of light by the light sources 5b will be described in detail later.

In the superimposing display device 5, the light sources 5b are driven and controlled via the control device and the like, and the display and non-display of the pattern 5c are thereby switched on the basis of the lighting and non-lighting of the light sources 5b. In the superimposing display device 5, when the light sources 5b are lighted, the pattern 5c is in a state of being displayed. That is, the light emitted from the light sources 5b is incident on the end surface of the transparent light guide plate 5a and propagates in the transparent light guide plate 5a, and at least a part of the components of the incident light reflected at the grooves 5d constituting the pattern 5c toward the front surface side. As a result, the pattern 5c is in a state of being visually recognized by the driver and the like (see FIGS. 3, 4, and others). In this case, when the driver views it from the front surface side (driver's seat side), the superimposing display device 5 forms a certain design, by superimposing the pattern 5c displayed on the transparent light guide plate 5a onto an image of the image display surface 3a of the display 3 that is located on the back surface side of the transparent light guide plate 5a. This enables a variety of display to be made. Meanwhile, when the light sources 5b are put out, the pattern 5c is in a state of non-display, and the superimposing display device 5 is in a state where the driver and the like can easily view various images displayed on the image display surface 3a by the light emitted from the display 3 and transmitted through the transparent light guide plate 5a.

The principal surface of the back surface side of the transparent light guide plate 5a on which the grooves 5d are formed as in the foregoing constitutes a second display surface 52 that is provided overlapping the first display surface 51 and transmits light, and on which the grooves 5d constituting a real image pattern 52a are formed. The real image pattern 52a is the above-described pattern 5c, and is the above-described "vehicle symbol (icon) imitating the vehicle," that is, a symbol of the vehicle, for example. The second display surface 52 is capable of switching between a display state and a non-display state while the first display surface 51 is in an on-state in which the real image 51a can be displayed. The display state of the second display surface 52 means a state of displaying the real image pattern 52a by the light emitted from the light sources 5b. Meanwhile, the non-display state of the second display surface 52 means a state of not displaying the real image pattern 52a by putting out the light sources 5b.

The above-described first display surface 51 and the second display surface 52 constitute a plurality of display surfaces overlapped in the depth direction, that is, in the vehicle travel direction. The first display surface 51 constitutes the display surface of the back side in the vehicle travel direction of the display surfaces and the second display surface 52 constitutes the display surface of the near side (viewing position side of a viewer such as a driver) in the vehicle travel direction of the display surfaces.

The facing plate 6 is a frame-shaped member that surrounds the peripheries of the dial plate 4, the transparent light guide plate 5a, and others and fastens the dial plate 4, the transparent light guide plate 5a, and others.

Then, the display device 1 in the first embodiment is constructed such that the polarization direction of the display 3 and the extending direction of the grooves 5d constituting the pattern 5c intersect at a certain angle range. This enables proper visibility to be ensured, in addition to achieving a variety of display by combining the display 3 and the superimposing display device 5. The polarization direction of the display 3, typically, corresponds to an ultimate transmission axis direction of the display 3, and the extending direction of the grooves 5d, typically, corresponds to the direction in which the grooves 5d extend.

The display 3 in the first embodiment is structured to emit light that is polarized in one direction and to display an image. Specifically, as illustrated in FIG. 5, the display 3 is structured, being stacked toward the front surface side from the back surface side in the depth direction, with and in order of the backlight 3b that serves as a main light source, a first polarizing plate 3c, a glass substrate (electrode) 3d, a liquid crystal layer 3e, a glass substrate (electrode) 3f, and a second polarizing plate 3g. In the display 3, typically, the front surface of the second polarizing plate 3g constitutes the surface of the above-described image display surface 3a, and on the front surface side of the second polarizing plate 3g, the transparent light guide plate 5a is arranged. The first polarizing plate 3c and the second polarizing plate 3g are provided between the backlight 3b and the second display surface 52, and are to change the light emitted toward the second display surface 52 from the backlight 3b into the light that is polarized in one direction.

In the display 3, the direction of electric field of the light emitted from the backlight 3b, typically, vibrates in all directions. The first polarizing plate 3c transmits, in the light emitted from the backlight 3b, only the electric field of the component of a first polarization direction, that is, the horizontal direction indicated by the arrow L1 in FIG. 5. This means that the first polarizing plate 3c defines the horizontal direction that is the first polarization direction as the transmission axis direction, and transmits the light that vibrates in the transmission axis direction, while blocking off the light that vibrates in an absorption axis direction orthogonal to the transmission axis direction. The second polarizing plate 3g transmits, of the light transmitted through the first polarizing plate 3c and twisted via the glass substrate 3d, the liquid crystal layer 3e, and the glass substrate 3f, only the electric field of the component of a second polarization direction, that is, the vertical direction indicated by the arrow L2 in FIG. 5. This means that the second polarizing plate 3g defines the vertical direction that is the second polarization direction as the transmission axis direction, and blocks off the light that vibrates in the absorption axis direction orthogonal to the transmission axis direction while transmitting the light that vibrates in the transmission axis direction. The direction of the electric field of the light transmitted through the first polarizing plate 3c and twisted via the glass substrate 3d, the liquid crystal layer 3e, and the glass substrate 3f is ultimately aligned to the transmission axis direction of the second polarizing plate 3g, that is, the vertical direction. Then, the light of the vibration direction along the transmission axis direction (polarization direction) of the second polarizing plate 3g, that is, the vertical direction, is incident on the transparent light guide plate 5a. This means that the ultimate polarization direction of the display 3 in the first embodiment, that is, the ultimate transmission axis direction of the display 3, corresponds to the polarization direction (the arrow L2 direction in FIG. 5) of the second polarizing plate 3g, that is, the transmission axis direction of the second polarizing plate 3g, and is the direction along the vertical direction. In the following description, the ultimate polarization direction of the display 3 may be referred to as "polarization direction L2."

Figure 14:
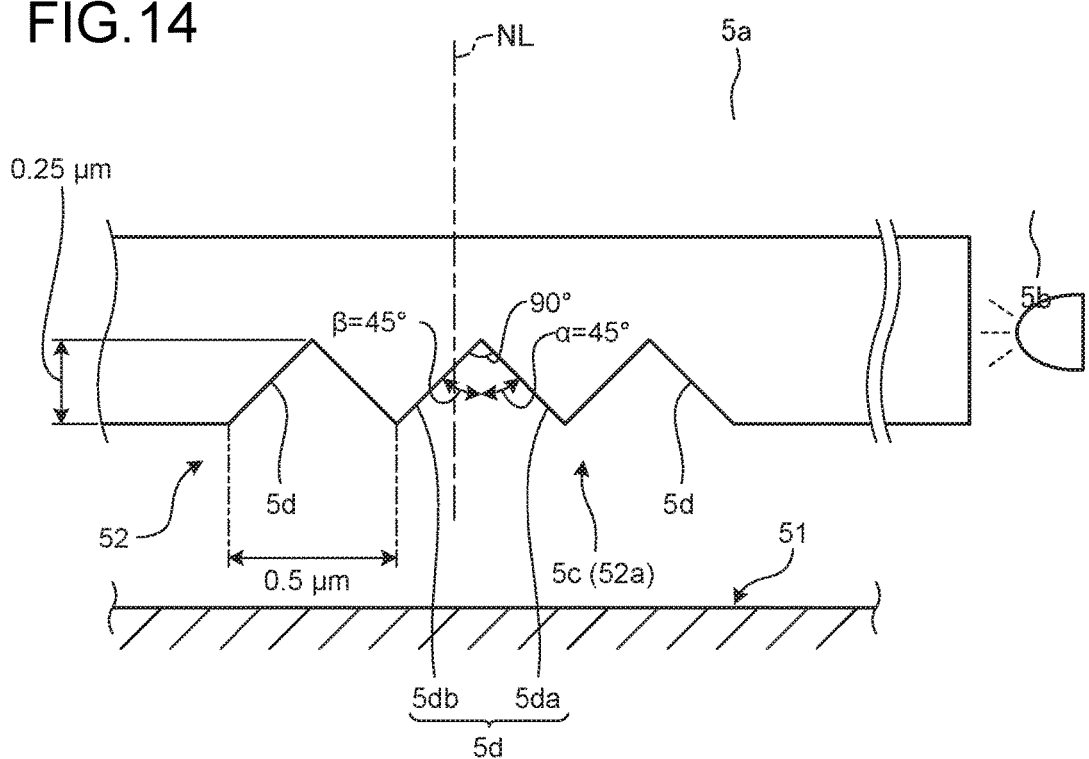
FIG. 14 is a schematic diagram for explaining the prerequisites of the luminance measurement test of the display device in the example.

Meanwhile, it is preferable that a plurality of fine grooves 5d constituting the pattern (display design) 5c be formed so that, as illustrated in FIG. 4 and others, for example, the cross-sectional shape orthogonal to the extending direction (see the arrow L3 in FIG. 5 and others) is in a substantially V-shaped cross-sectional shape and that the pitch thereof is 1 μm or smaller (the lower limit is a size that can be manufactured, for example). In more detail, the groove 5d, as illustrated in later-described FIG. 14, is formed such that a bottom portion forms an angle by a first groove forming surface 5da that lies along the extending direction L3 and a second groove forming surface 5db that lies along the extending direction L3 and is connected to the first groove forming surface 5da. The angle of the bottom portion of the groove 5d is not the angle of the apex portion of the surface side of the transparent light guide plate 5a (in other words, the angle of the apex portion of the first display surface 51 side) but the angle of the bottom portion sunken from the surface of the transparent light guide plate 5a (in other words, the angle of the bottom portion away from the first display surface 51), and is the angle of the front surface side in the depth direction (the angle of the upper side in FIG. 14). Accordingly, in a cross-sectional view orthogonal to the extending direction L3, the groove 5d is formed in a substantially V-shaped cross-sectional shape, in other words, in a substantially triangular cross-sectional shape. The groove 5d is formed symmetrical to a normal line NL as a center line of the surface on which the groove 5d is formed (the principal surface of the back surface side of the transparent light guide plate 5a), in a cross-sectional view orthogonal to the extending direction L3. The normal line NL, typically, is a line along the depth direction, and more precisely, is a line along the direction orthogonal to the extending direction L3 of the groove 5d and to an irradiation direction L4 of light by the light sources 5b which will be described later. The surface on which the grooves 5d are formed, that is, the principal surface of the back surface side of the transparent light guide plate 5a is opposite to the first display surface 51 in a parallel positional relation with respect to the depth direction. The above-described light sources 5b are located on the first groove forming surface 5da side, that is, the first groove forming surface 5da forms the groove 5d and is located on the incident side of the light from the light sources 5b than the second groove forming surface 5db. The groove 5d, as in the foregoing, is formed symmetrical to the normal line NL as the center line of the surface on which the groove 5d is formed, in a cross-sectional view orthogonal to the extending direction L3. In other words, the groove 5d is formed so that a first groove-forming surface angle α and a second groove-forming surface angle β illustrated in FIG. 14 are substantially equal to each other (α=β). The first groove-forming surface angle α, in a cross-sectional view orthogonal to the extending direction L3, is an angle formed by the normal line NL of the surface on which the groove 5d is formed, and by the first groove forming surface 5da, and is the angle located on the first display surface 51 side and on the opposite side of the second groove forming surface 5db side. The second groove-forming surface angle β, in a cross-sectional view orthogonal to the extending direction L3, is an angle formed by the normal line NL and by the second groove forming surface 5db, and is the angle located on the first display surface 51 side and on the opposite side of the first groove forming surface 5da side. Furthermore, each groove 5d is formed as a straight groove extending in one direction. The transparent light guide plate 5a is structured so that the transmittance of the material in the area of the pattern 5c and the transmittance of the material of the surrounding area of the pattern 5c in the transparent light guide plate 5a are equal. In a diffraction grating constituted by such fine grooves 5d, the diffraction efficiency when the vibration direction of the light is perpendicular (orthogonal) to the extending direction L3 of the grooves 5d tends to be different from when it is parallel to the extending direction L3. That is, the diffraction grating constituted by such fine grooves 5d, typically, tends to block off the light for which the vibration direction is parallel to the extending direction L3 of the grooves 5d while transmitting the light for which the vibration direction is perpendicular to the extending direction L3 of the grooves 5d. This means that the fine grooves 5d formed on the transparent light guide plate 5a present an effect similar to that of a polarizing plate, define the direction orthogonal to the extending direction L3 of the grooves 5d as the transmission axis direction, and block off the majority of the light that vibrates in the absorption axis direction (the extending direction L3 of the grooves 5d) orthogonal to the transmission axis direction while transmitting the light that vibrates in the transmission axis direction.

The display device 1 in the first embodiment, by superimposing the grooves 5d formed on the transparent light guide plate 5a (the second display surface 52) on the image display surface 3a (the first display surface 51) of the display 3, and by utilizing the fact that the transmitted light being transmitted through the area in which the grooves 5d are formed changes according to the relation between the extending direction L3 of the grooves 5d and the polarization direction L2 (transmission axis direction) of the display 3 as in the foregoing, achieves the structure that the grooves 5d constituting the pattern 5c on the transparent light guide plate 5a are hard to be visually recognized when the pattern 5c (the real image pattern 52a) on the transparent light guide plate 5a is not displayed.

Specifically, the display device 1 in the first embodiment, as illustrated in FIG. 6, is constructed such that the polarization direction L2 of the display 3 and the extending direction L3 of the grooves 5d constituting the pattern 5c intersect at an angle range of 75° to 105°. In FIG. 6, in the area of the image display surface 3a of the display 3, the polarization direction L2 of the display 3, that is, the transmission axis of the display 3 is schematically illustrated with lines. When an angle that the polarization direction (transmission axis direction) L2 of the display 3 and the extending direction L3 of the grooves 5d constituting the pattern 5c is defined as an angle θ, the grooves 5d are formed on the transparent light guide plate 5a such that the angle θ satisfies a conditional expression of 75°≤θ≤105°. That is, the polarization direction L2 and the extending direction L3 intersect by having a certain angle θ within the range of 75° to 105°. More preferably, the polarization direction L2 and the extending direction L3 intersect by having a certain angle θ within the range of 85° to 95°.

Here, the polarization direction L2 of the display 3 and the extending direction L3 of the grooves 5d constituting the pattern 5c are orthogonal to each other. More precisely, the grooves 5d are formed on the transparent light guide plate 5a such that the extending direction L3 of the grooves 5d is orthogonal to the polarization direction L2 of the display 3, and such that the transmission axis direction of the diffraction grating that is constituted by the fine grooves 5d is parallel to the polarization direction L2. Note that, in the case that the polarization direction L2 of the display 3 and the extending direction L3 of the grooves 5d are orthogonal, an error within a range of tolerable error angle in accordance with the tolerance allowed in manufacturing of the display device 1 is allowed, in addition to the case of θ=90°, for example. That is, the grooves 5d are formed on the transparent light guide plate 5a so that the angle θ will be θ≅90°.

The display device 1 configured as in the foregoing is structured, as illustrated in FIG. 7, such that the polarization direction L2 of the display 3 and the extending direction L3 of the grooves 5d are orthogonal to each other (θ=90°), in other words, such that the polarization direction L2 of the display 3 and the transmission axis direction of the grooves 5d are in parallel. Accordingly, in the display device 1, in a state where the light sources 5b are put out, the area inside the pattern 5c transmits, as the same as the area outside of the pattern 5c, almost all of the light from the display 3. As a result, the display device 1 is in a state where the amplitude of the transmitted light of the area of the pattern 5c and that of the area in the periphery of the pattern 5c are substantially equal and there is substantially no difference between the luminance of the area of the pattern 5c and that of the area in the periphery of the pattern 5c. That is, in the display device 1, a luminance ratio that represents the ratio of the luminance of the area of the pattern 5c to the luminance of the area in the periphery of the pattern 5c in the transparent light guide plate 5a (hereinafter, it may simply be referred to as "luminance ratio of the area of the pattern 5c to the area in the periphery of the pattern 5c") is maximized. Thus, the area of the pattern 5c is hardly noticeable against the area in the periphery of the pattern 5c and the pattern 5c can be made hard to be visually recognized.

The luminance ratio of the area of the pattern 5c to the area in the periphery of the pattern 5c can, typically, be expressed by "the luminance of the area of the pattern 5c/the luminance of the area in the periphery of the pattern 5c×100 (%)." The luminance ratio of the area of the pattern 5c to the area in the periphery of the pattern 5c represents that, when the luminance ratio is 100%, the luminance of the area in the periphery of the pattern 5c and the luminance of the area of the pattern 5c are equal. The luminance ratio represents that, as the luminance ratio becomes smaller, the luminance difference between the area in the periphery of the pattern 5c and the area of the pattern 5c becomes relatively larger.

Meanwhile, in the display device 1, for example, when the transparent light guide plate 5a, as illustrated in FIG. 8, is rotated relative to the image display surface 3a from the state where the polarization direction L2 and the extending direction L3 are orthogonal to each other (θ=90° to a state where the polarization direction L2 and the extending direction L3 intersect at a certain angle (θ≠90°, the amplitude of the transmitted light of the area of the pattern 5c, as illustrated in FIGS. 9 and 10, tends to be smaller than the amplitude of the transmitted light of the area in the periphery of the pattern 5c. That is, in this case, in the display device 1, the amplitude component of the light that is transmitted through the area of the pattern 5c is attenuated, as illustrated in FIG. 10. Thus, as illustrated in FIG. 9, the amplitude of the transmitted light in the area of the pattern 5c becomes smaller than the amplitude of the transmitted light in the area of the periphery of the pattern 5c. As a result, in the display device 1, as compared with the case in FIG. 7, the luminance ratio of the area of the pattern 5c to the area in the periphery of the pattern 5c becomes relatively small, and the area of the pattern 5c becomes relatively noticeable against the area in the periphery of the pattern 5c.

However, in the display device 1, as in the foregoing, because the luminance ratio of the area of the pattern 5c to the area in the periphery of the pattern 5c falls within a certain luminance ratio range if the angle θ between the polarization direction L2 of the display 3 and the extending direction L3 of the grooves 5d is within the range of 75°≤θ≤105° (preferably 85°≤θ≤95°), the pattern 5c can be maintained in a state of being hard to be visually recognized. The certain luminance ratio range is a range of 90% to 100%, more preferably a range of 92.5% to 100%, for example. In the display device 1, if the luminance ratio of the area of the pattern 5c to the area in the periphery of the pattern 5c is within the certain luminance ratio range, the area of the pattern 5c is hardly noticeable against the area in the periphery of the pattern 5c and pattern 5c can be made hard to be visually recognized. That is, the display device 1, as in the foregoing, can be structured such that the polarization direction L2 of the display 3 and the extending direction L3 of the grooves 5d intersect at the angle range of 75° to 105°, more preferably at the angle range of 85° to 95°. Thus, the display device 1 can thereby be structured such that the polarization direction L2 of the display 3 and the extending direction L3 of the grooves 5d intersect at an angle range in which the luminance ratio of the luminance of the area of the pattern 5c to the luminance of the area in the periphery of the pattern 5c in the transparent light guide plate 5a becomes 90% to 100%.

From the state illustrated as in FIG. 8, when the transparent light guide plate 5a is further rotated relative to the image display surface 3a beyond the range of 75°≤θ≤105° into a state where the polarization direction L2 and the extending direction L3 are in parallel (θ=0°, 180°) as illustrated in FIG. 11, the amplitude of the transmitted light of the area of the pattern 5c gets further smaller than the amplitude of the transmitted light of the area in the periphery of the pattern 5c as illustrated in FIG. 12. In this case, the luminance ratio of the area of the pattern 5c to the area in the periphery of the pattern 5c is minimized, and the area of the pattern 5c becomes noticeable against the area in the periphery of the pattern 5c (the area of the pattern 5c appears dark).

Furthermore, the display device 1 in the first embodiment, as illustrated in FIG. 2 and others, is structured such that the extending direction L3 of the grooves 5d and the irradiation direction L4 of the light by the light sources 5b of the superimposing display device 5 are orthogonal to each other. That is, the polarization direction L2 of the display 3 and the irradiation direction L4 of the light by the light sources 5b are the directions along the vertical direction, and the extending direction L3 of the grooves 5d is the direction along the horizontal direction. The transparent light guide plate 5a in the first embodiment is formed such that the length in the horizontal direction is larger than the length in the vertical direction, and the light sources 5b are arranged on the lower side in the vertical direction of the transparent light guide plate 5a or on the upper side in the vertical direction thereof. In the first embodiment, three pieces of the light sources 5b are provided, at equal intervals along the width direction (horizontal direction), at the locations that are on the lower side in the vertical direction of the area on which the pattern 5c is formed and are opposite to the end surface of the lower side in the vertical direction of the transparent light guide plate 5a, and the light sources 5b irradiate light toward the upper side in the vertical direction. Each light source 5b is arranged at a location hidden by the facing plate 6 when viewed from the front surface side, for example.

In the second display surface 52, as illustrated in FIGS. 3, 4, 5, and others, on the principal surface of the back surface side of the transparent light guide plate 5a, a plurality of fine grooves 5d are formed so that the polarization direction L2, the extending direction L3, the irradiation direction L4, and others are in the positional relation as in the foregoing, and a display structure 53 of the real image pattern 52a (the pattern 5c) and a non-display structure 54 are thereby constructed.

The display structure 53 of the second display surface 52 is a structure to form the real image pattern 52a (the pattern 5c) by the light emitted from the light sources 5b in a display state of the second display surface 52. The display structure 53 is the structure to form, in a display state of the second display surface 52, the real image pattern 52a by reflecting the light emitted from the light sources 5b at the fine grooves 5d formed as an uneven portion on the surface of the transparent light guide plate 5a that is a member constituting the second display surface 52. Accordingly, the display structure 53 can realize a state where the driver and the like can visually recognize the real image pattern 52a on the second display surface 52.

Meanwhile, the non-display structure 54 of the second display surface 52 is a structure that makes the real image pattern 52a hard to be visually recognized, in a non-display state of the second display surface 52, as compared with the display state. More precisely, the non-display structure 54 of the second display surface 52 is a structure that makes the fine grooves 5d as an uneven portion hard to be visually recognized, in the non-display state of the second display surface 52, as compared with the display state. The non-display structure 54 is a structure that makes the real image pattern 52a hard to be visually recognized by putting out the light sources 5b, and that further makes the grooves 5d themselves hard to be visually recognized by forming the grooves 5d such that the polarization direction L2 of the display 3 and the extending direction L3 of the grooves 5d constituting the real image pattern 52a (the pattern 5c) intersect at a certain angle range, typically, at the angle range of 75° to 105° as in the foregoing. Consequently, the non-display structure 54 makes the amplitude of the transmitted light of the area of the real image pattern 52a on the second display surface 52, and that of the area in the periphery of the real image pattern 52a be substantially equal, and can achieve a state in which there is substantially no difference in the luminance of the area of the real image pattern 52a and the area in the periphery of the real image pattern 52a. Thus, in the non-display state, the real image pattern 52a and the fine grooves 5d as an uneven portion constituting the real image pattern 52a can be made hard to be visually recognized.

According to the display device 1 described in the foregoing, the first display surface 51 that displays vehicle information by the light emitted from the backlight 3b; the second display surface 52 that is provided overlapping the first display surface 51 and transmits light, and also has the grooves 5d constituting the pattern 5c (the real image pattern 52a) formed thereon and is capable of switching between the display state of displaying the pattern 5c by the light emitted from the light sources 5b and the non-display state of not displaying the pattern 5c by putting out the light sources 5b; and the first polarizing plate 3c and the second polarizing plate 3g that are provided between the backlight 3b and the second display surface 52 and change the light that is emitted toward the second display surface 52 from the backlight 3b into the light that is polarized in one direction are included, and the polarization direction L2 of the light that is polarized by the first polarizing plate 3c and by the second polarizing plate 3g and the extending direction L3 of the grooves 5d intersect. Here, the first display surface 51 displays the real image 51a concerning the vehicle information by the light emitted from the backlight 3b.

Accordingly, the display device 1 can display the information by combining the vehicle information displayed on the first display surface 51, that is, the real image 51a concerning the vehicle, by the light emitted from the backlight 3b, with the real image pattern 52a (the pattern 5c) that is displayed on the second display surface 52 that is provided overlapping the first display surface 51, transmits light, and is switched between the display and non-display on the basis of the lighting and non-lighting of the light sources 5b. Then, the display device 1 is structured such that the polarization direction L2 of the light emitted from the backlight 3b and polarized by the first polarizing plate 3c and the second polarizing plate 3g and the extending direction L3 of the grooves 5d constituting the real image pattern 52a intersect at a certain angle range. Thus, when the real image pattern 52a is made not to be displayed, the luminance ratio that represents the ratio of the luminance of the area of the real image pattern 52a to the luminance of the area in the periphery of the real image pattern 52a in the second display surface 52 can be made relatively large. Accordingly, the display device 1, when the light sources 5b are put out and the real image pattern 52a on the second display surface 52 constituted by the grooves 5d is made not to be displayed, can make the grooves 5d, which constitute the real image pattern 52a on the second display surface 52, hard to be visually recognized, and can suppress the visibility of the vehicle information displayed on the first display surface 51 from being disturbed. As a result, the display device 1 can ensure proper visibility, in addition to achieving a variety of display, for example.

Furthermore, the display device 1 is different from a display device that, for example, displays a display that is equivalent to the real image pattern 52a by a virtual image on a display surface that overlaps on the first display surface 51 and the like by using a semitransparent mirror and the like, and without providing a reflection structure to project the virtual image on the display surface or providing a video device for the virtual image, the display device 1 can perform a variety of display by combining the first display surface 51 and the second display surface 52. As a result, the display device 1 can suppress the device from being increased in size in addition to achieving a variety of display forms, and can suppress the manufacturing cost, for example. Moreover, when the display equivalent to the real image pattern 52a by the virtual image as in the foregoing is displayed, the real image pattern 52a by the virtual image actually appears to be present on the back side farther than the display surface. In contrast, the display device 1 in the first embodiment can display the actual real image pattern 52a on the immediate front side of the vehicle information displayed on the first display surface 51. As a result, the display device 1 can further improve the visual sense of unity of the vehicle information that is displayed on the first display surface 51 and the real image pattern 52a that is displayed on the second display surface 52, and can improve the visibility. This means that the display device 1 displays the design of the real image pattern 52a on the front surface side of the vehicle information of the first display surface 51 and can make a display by stereoscopic combination of the background of the vehicle information and the real image pattern 52a of the design, and thus a three-dimensional and novel display can be made, for example.

In more detail, according to the display device 1 described in the foregoing, included are the display 3 that includes the image display surface 3a that emits the light polarized in one direction and displays an image (the real image 51a); and the superimposing display device 5 that includes the transparent light guide plate 5a that is provided overlapping the image display surface 3a, transmits the light emitted from the display 3, and has the grooves 5d constituting the pattern 5c (the real image pattern 52a) formed thereon and the light sources 5b that irradiate the end surface of the transparent light guide plate 5a with light and is switched between the display and non-display of the pattern 5c on the basis of the lighting and non-lighting of the light sources 5b. In this case, the display 3 includes the above-described first display surface 51 that constitutes the image display surface 3a, and includes the first polarizing plate 3c and the second polarizing plate 3g. The superimposing display device 5 includes the above-described second display surface 52. Then, the polarization direction L2 of the display 3 and the extending direction L3 of the grooves 5d intersect at the angle range of 75° to 105°. Thus, according to the display device 1, in a state where the light sources 5b are put out and where an image is displayed on the image display surface 3a, the polarization direction L2 of the display 3 and the extending direction L3 of the grooves 5d are structured to intersect at an angle range in which the luminance ratio of the luminance of the area of the pattern 5c to the luminance of the area in the periphery of the pattern 5c in the transparent light guide plate 5a is of 90% to 100%. Note that the transparent light guide plate 5a is structured so that the transmittance of the material in the area of the pattern 5c and the transmittance of the material of the surrounding area of the pattern 5c in the transparent light guide plate 5a are equal.

Accordingly, the display device 1 can achieve a variety of display by combining the display of an image (the real image 51a) on the image display surface 3a of the display 3, and the display of the pattern 5c (the real image pattern 52a) on the transparent light guide plate 5a of the superimposing display device 5 that is provided overlapping the image display surface 3a. Then, the display device 1 is structured such that the polarization direction L2 of the display 3 and the extending direction L3 of the grooves 5d intersect at a certain angle range. Thus, when the pattern 5c on the transparent light guide plate 5a is made not to be displayed, the luminance ratio of the luminance of the area of the pattern 5c to the luminance of the area in the periphery of the pattern 5c in the transparent light guide plate 5a can be made relatively large. Accordingly, the display device 1, when the light sources 5b are put out and the pattern 5c on the transparent light guide plate 5a constituted by the fine grooves 5d is made not to be displayed, can make the grooves 5d, which constitute the pattern 5c on the transparent light guide plate 5a, hard to be visually recognized, and can suppress the visibility of the image displayed on the image display surface 3a of the display 3 from being disturbed. As a result, the display device 1 can ensure proper visibility, in addition to achieving a variety of display, for example.

That is, the display device 1 displays the design of the pattern 5c on the front surface side of the image display surface 3a of the display 3 and can make a display by stereoscopic combination of the background of image information on the image display surface 3a with the design of the pattern 5c, and thus a three-dimensional and novel display can be made, for example. In addition to that, the display device 1, on the superimposing display device 5 on which the pattern 5c is formed by the fine grooves 5d, can make the design of the pattern 5c hardly visible and make the image display surface 3a on the background of the transparent light guide plate 5a be seen through when the light sources 5b are put out, and can make the design of the pattern 5c appear when the light sources 5b are lighted as needed.

In more detail, according to the display device 1 described in the foregoing, the polarization direction L2 of the display 3 and the extending direction L3 of the grooves 5d are orthogonal to each other. Thus, the display device 1, when the pattern 5c on the transparent light guide plate 5a is made not to be displayed, can maximize the luminance ratio of the area of the pattern 5c to the area in the periphery of the pattern 5c. Accordingly, the display device 1, when the pattern 5c on the transparent light guide plate 5a is made not to be displayed, can reliably make the grooves 5d hard to be visually recognized, and can reliably suppress the visibility of the image displayed on the image display surface 3a of the display 3 from being disturbed.

Moreover, according to the display device 1 described in the foregoing, the extending direction L3 of the grooves 5d and the irradiation direction L4 of the light by the light sources 5b are orthogonal to each other. Accordingly, the display device 1 can make the light from the light sources 5b substantially perpendicularly incident on the grooves 5d constituting the pattern 5c. Thus, the display device 1 can, when displaying the pattern 5c on the transparent light guide plate 5a, relatively increase the amount of the light reflected at the grooves 5d toward the front surface side (driver's seat side), and can clearly display the pattern 5c.

Furthermore, according to the display device 1 described in the foregoing, the polarization direction L2 of the display 3 and the irradiation direction L4 of the light by the light sources 5b are the directions along the vertical direction, and the extending direction L3 of the grooves 5d is the direction along the horizontal direction. The transparent light guide plate 5a is formed such that the length of the horizontal direction is larger than the length of the vertical direction, and the light sources 5b are arranged on the lower side in the vertical direction of the transparent light guide plate 5a or on the upper side in the vertical direction thereof. Accordingly, the display device 1, by bringing and arranging the light sources 5b close to the grooves 5d, can implement more compactly the structure that makes the extending direction L3 of the grooves 5d and the irradiation direction L4 of the light by the light sources 5b orthogonal and makes the light from the light sources 5b substantially perpendicularly incident on the grooves 5d.

In the foregoing description, it has been exemplified that the display 3 is structured with a single display 3. However, the display 3 may be structured by combining two or more displays 3.

In the foregoing description, it has been exemplified that the display device 1 is applied to a vehicle. However, it is not limited thereto, and the display device 1 may be applied to display devices other than the vehicle.

The display device 1 described in the foregoing only needs to be structured such that the polarization direction L2 of the display 3 and the extending direction L3 of the grooves 5d intersect at the angle range of 75° to 105°, in other words, such that they intersect at an angle range in which the luminance ratio of the luminance of the area of the pattern 5c to the luminance of the area in the periphery of the pattern 5c in the transparent light guide plate 5a is of 90% to 100%. In the display device 1, the polarization direction L2 of the display 3 may be inclined with respect to the vertical direction, for example. Even in this case, the polarization direction L2 of the display 3 and the extending direction L3 of the grooves 5d only need to be in the relation as in the foregoing.

In the foregoing description, it has been described that three pieces of the light sources 5b are to be provided, at equal intervals along the width direction (horizontal direction), at the locations that are on the lower side in the vertical direction of the area on which the pattern 5c is formed and are opposite to the end surface of the lower side in the vertical direction of the transparent light guide plate 5a, and that the light sources 5b are to irradiate light toward the upper side in the vertical direction. However, the light sources 5b are not limited thereto, and may be provided on the upper side in the vertical direction of the transparent light guide plate 5a or may be provided on the lateral side in the width direction of the transparent light guide plate 5a.

For example, the grooves 5d constituting the above-described pattern 5c may be formed on the principal surface of the front surface side in the depth direction of the transparent light guide plate 5a, and the principal surface of the front surface side in the depth direction of the transparent light guide plate 5a may constitute the second display surface 52.

EXAMPLE

FIGS. 13, 14, 15, 16, 17, and 18 are schematic diagrams for explaining prerequisites of a luminance measurement test of a display device in an example. FIG. 19 is a chart representing the result of the luminance measurement test of the display device in the example. The following describes the example of the display device with reference to FIGS. 13 to 19.

Figure 13:
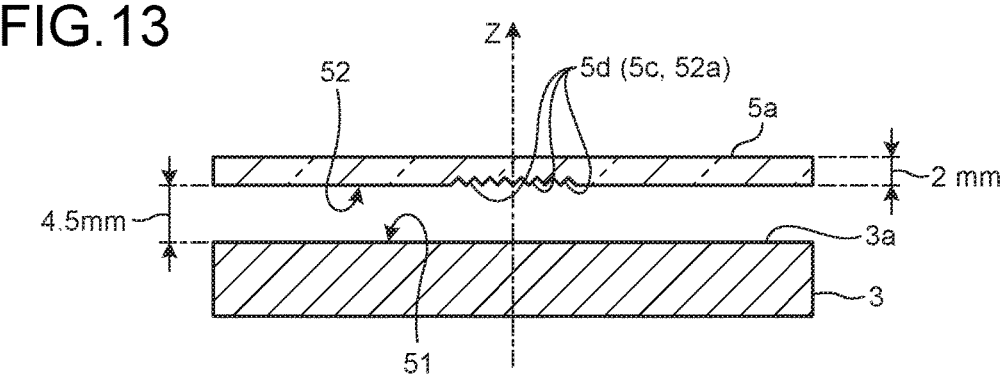
FIG. 13 is a schematic diagram for explaining prerequisites of a luminance measurement test of a display device in an example.
Figure 15:
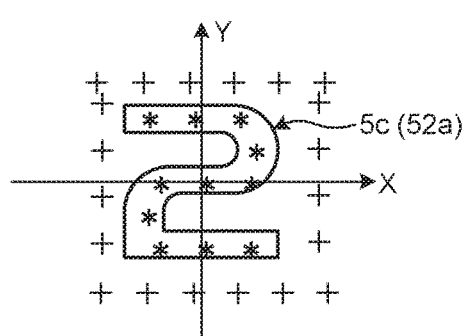
FIG. 15 is a schematic diagram for explaining the prerequisites of the luminance measurement test of the display device in the example.

The display device 1 in the foregoing first embodiment was prototyped, and a luminance measurement test that measures, with a luminance measurement camera, the luminance of the area of the pattern 5c (the real image pattern 52a) in the transparent light guide plate 5a and of the area in the periphery of the pattern 5c in the transparent light guide plate 5a was conducted by using the display device 1. In the display device 1 of this example, the display 3, the transparent light guide plate 5a, and others were arranged so as to be arranged as illustrated in FIG. 13. That is, in the display device 1 of this example, the thickness in the depth direction of the transparent light guide plate 5a was made to be 2 mm. The distance in the depth direction between the image display surface (surface) 3a of the display 3, that is, the first display surface 51, and the rear surface (back surface) of the transparent light guide plate 5a, that is, the second display surface 52 was made to be 4.5 mm. Then, in the display device 1 of this example, on the back surface of the transparent light guide plate 5a, that is, on the surface of the transparent light guide plate 5a opposite to the image display surface 3a, the grooves 5d constituting the pattern 5c were formed. The luminance measurement position with respect to a Z direction (depth direction) in the luminance measurement test is a position on the back surface of the transparent light guide plate 5a, that is, a position on the second display surface 52 on which the grooves 5d were formed, and corresponds to a focus position of the luminance measurement camera. In the display device 1 of this example, the grooves 5d were formed so as to be in a shape illustrated in FIG. 14. That is, in the display device 1 of this example, the grooves 5d were formed in a substantially V-shaped cross-sectional shape (cross-sectional shape orthogonal to the extending direction L3), and in a pitch of 0.5 μm. Furthermore, in the display device 1 of this example, the depth in the depth direction of each groove 5d was made to be 0.25 μm, and the angle that the bottom portion forms was made to be substantially 90 deg. Each of the grooves 5d, as in the foregoing, was formed symmetrical to the normal line NL as the center line of the surface on which the groove 5d was formed, in a cross-sectional view orthogonal to the extending direction L3, and was made so that the first groove-forming surface angle $\alpha$=the second groove-forming surface angle $\beta$=45 deg. Furthermore, in the display device 1 of this example, each groove 5d was formed as a straight groove extending in one direction. As for the luminance measurement position in this luminance measurement test with respect to an X direction (width direction) and a Y direction (vertical direction), as illustrated in FIG. 15, a plurality of positions for the area of the pattern 5c in the transparent light guide plate 5a and a plurality of positions for the area in the periphery of the pattern 5c in the transparent light guide plate 5a were selected and the average values of those positions were used. As for the lighting condition of light source color of the display 3, by using the red light of X=0.63 and Y=0.35 on a chromaticity diagram, the green light of X=0.31 and Y=0.58, and the blue light of X=0.14 and Y=0.05, the respective luminance measurement tests were conducted.

Figure 16:
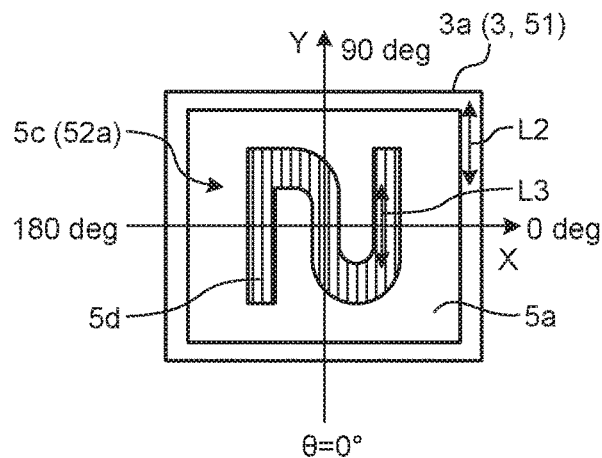
FIG. 16 is a schematic diagram for explaining the prerequisites of the luminance measurement test of the display device in the example.
Figure 17:
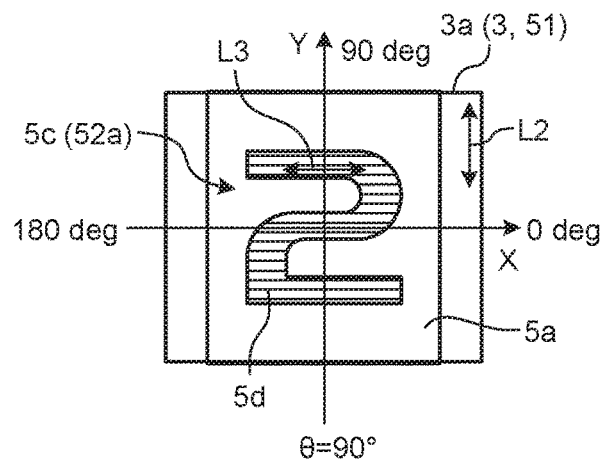
FIG. 17 is a schematic diagram for explaining the prerequisites of the luminance measurement test of the display device in the example.
Figure 18:
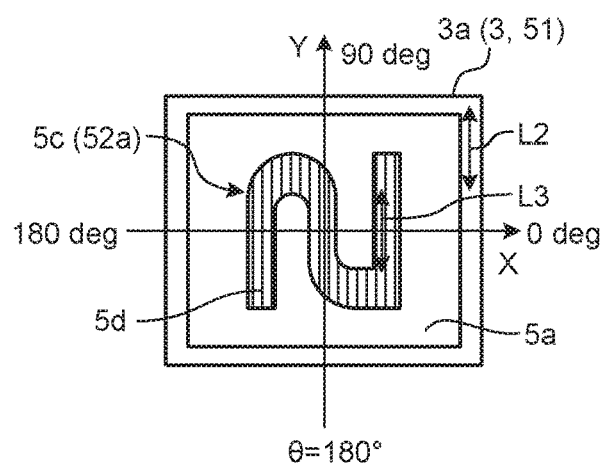
FIG. 18 is a schematic diagram for explaining the prerequisites of the luminance measurement test of the display device in the example.
Figure 19:
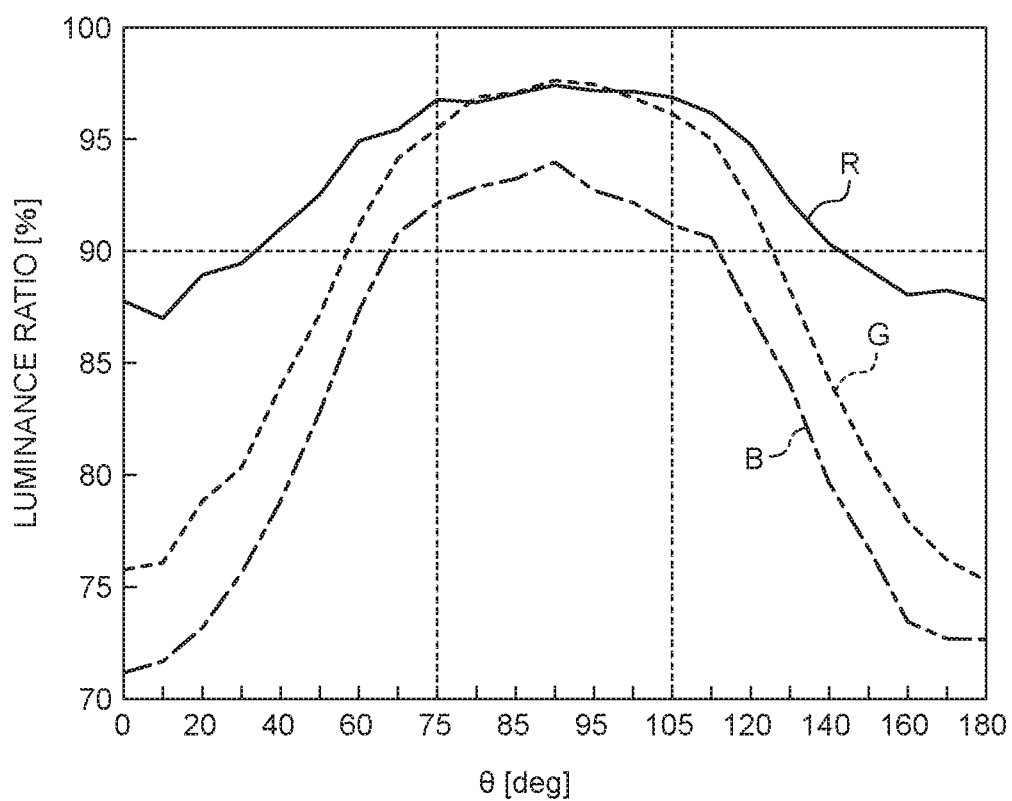
FIG. 19 is a chart representing the result of the luminance measurement test of the display device in the example.

In this luminance measurement test, the display device 1 configured as in the foregoing was used and, as illustrated in FIGS. 16, 17, and 18, in a state where the light sources 5b were put out, the transparent light guide plate 5a was rotated relative to the image display surface 3a. While varying the angle θ that the polarization direction L2 of the display 3 and the extending direction L3 of the grooves 5d constituting the pattern 5c (the real image pattern 52a) form, the luminance of the area of the pattern 5c in the transparent light guide plate 5a and the luminance of the area in the periphery of the pattern 5c in the transparent light guide plate 5a were measured by using the luminance measurement camera at the above-described luminance measurement positions. FIG. 16 illustrates a state of θ=0 deg, that is, a state where the polarization direction L2 and the extending direction L3 are in parallel. In this luminance measurement test, by rotating the transparent light guide plate 5a counterclockwise from the state of FIG. 16, through a state of θ=90 deg, that is, a state where the polarization direction L2 and the extending direction L3 are orthogonal as illustrated in FIG. 17, and until a state where θ=180 deg and the polarization direction L2 and the extending direction L3 are in parallel again as illustrated in FIG. 18, the luminance at the respective positions was measured at a certain angle interval, that is, an increment of 5 deg.

FIG. 19 represents the result of the above-described luminance measurement test. FIG. 19 defines the abscissa axis as the angle θ (deg) where the polarization direction L2 of the display 3 and the extending direction L3 of the grooves 5d constituting the pattern 5c (the real image pattern 52a) form, and defines the ordinate axis as the luminance ratio (%) of the luminance of the area of the pattern 5c to the area in the periphery of the pattern 5c in the transparent light guide plate 5a. In FIG. 19, the line R represents the luminance ratio that was obtained when irradiated with the red light of X=0.63 and Y=0.35, the line G represents the luminance ratio that was obtained when irradiated with the green light of X=0.31 and Y=0.58, and the line B represents the luminance ratio that was obtained when irradiated with the blue light of X=0.14 and Y=0.05.

In the display device 1, as is apparent from FIG. 19, when the angle θ where the polarization direction L2 of the display 3 and the extending direction L3 of the grooves 5d form is within the range of 75°≤θ≤105°, for all the three colors of red, green, and blue, the luminance ratio of the area of the pattern 5c to the area in the periphery of the pattern 5c (the real image pattern 52a) is of 90% to 100%. Thus, it is apparent that, when the pattern 5c is made not to be displayed, the grooves 5d constituting the pattern 5c on the transparent light guide plate 5a can be made hard to be visually recognized. Also in the display device 1, when the angle θ is within the range of 85°≤θ≤95°, for all the three colors of red, green, and blue, the luminance ratio of the area of the pattern 5c to the area in the periphery of the pattern 5c is of 92.5% to 100%, and thus it is apparent that the grooves 5d can be made further harder to be visually recognized. In the display device 1, when the angle θ is θ=90°, that is, when the polarization direction L2 and the extending direction L3 are orthogonal, for all the three colors of red, green, and blue, the luminance ratio of the area of the pattern 5c to the area in the periphery of the pattern 5c is maximized, and thus it is apparent that the grooves 5d can be made hardest to be visually recognized. In the display device 1, when the angle θ is θ=90°, the luminance ratio obtained when irradiated with the red light was 97.4%, the luminance ratio obtained when irradiated with the green light was 97.6%, and the luminance ratio obtained when irradiated with the blue light was 94%. As in the foregoing, it is apparent that the display device 1 of this example can ensure proper visibility, in addition to achieving a variety of display.

Second Embodiment

Figure 20:
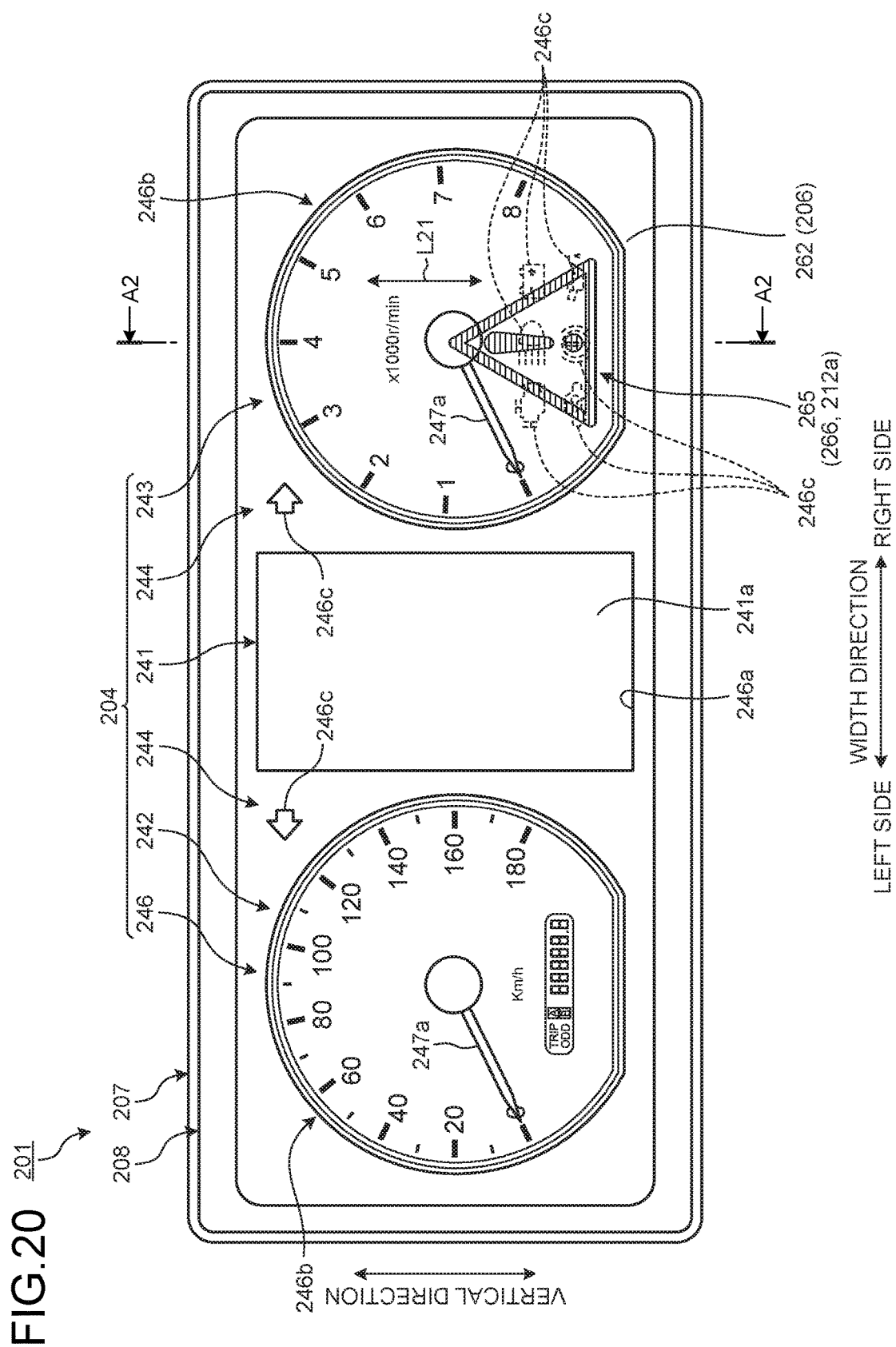
FIG. 20 is a front view of the front surface side in a depth direction of a display device according to a second embodiment.
Figure 21:
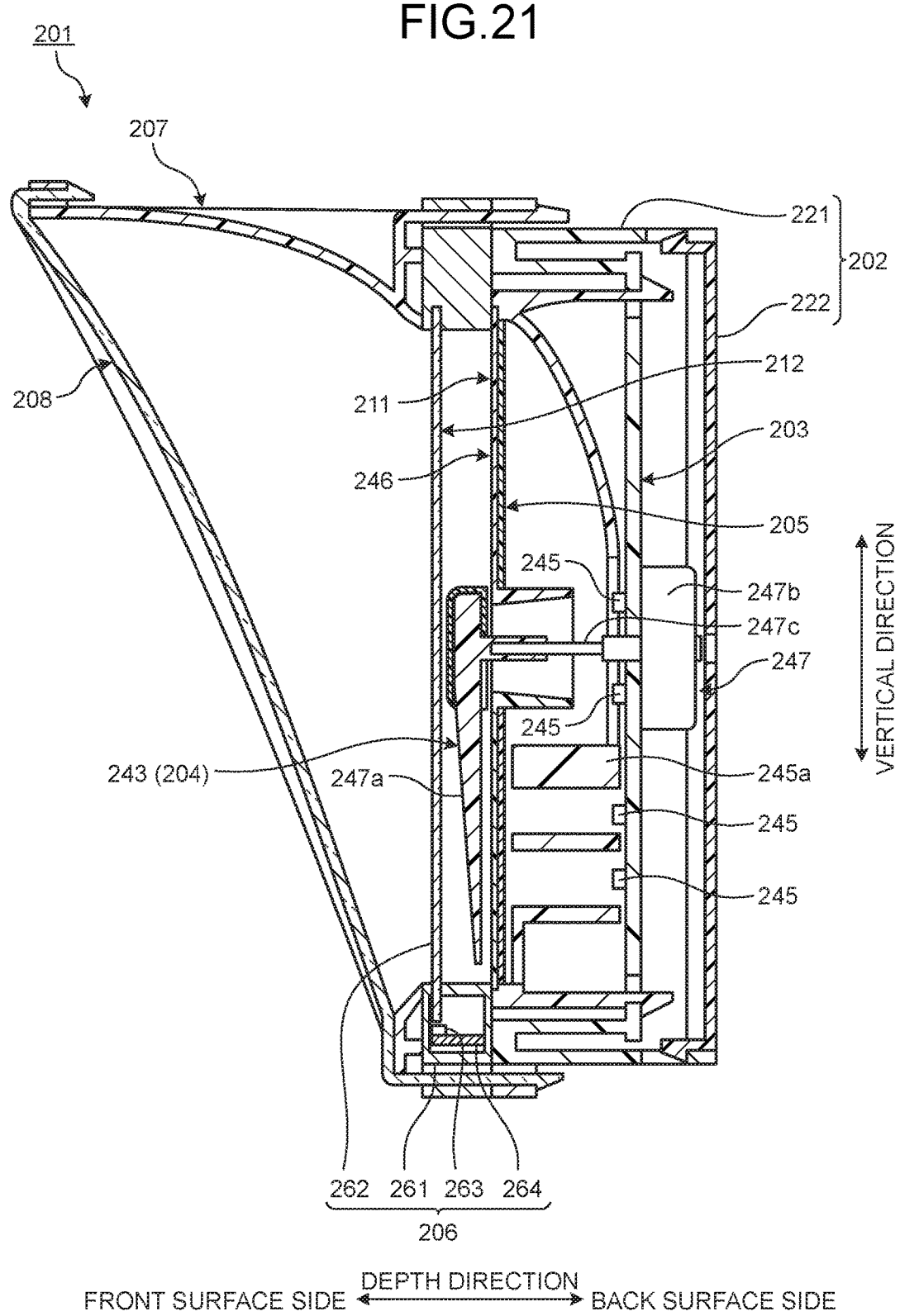
FIG. 21 is a cross-sectional view along the line A2-A2 indicated in FIG. 20.
Figure 22:
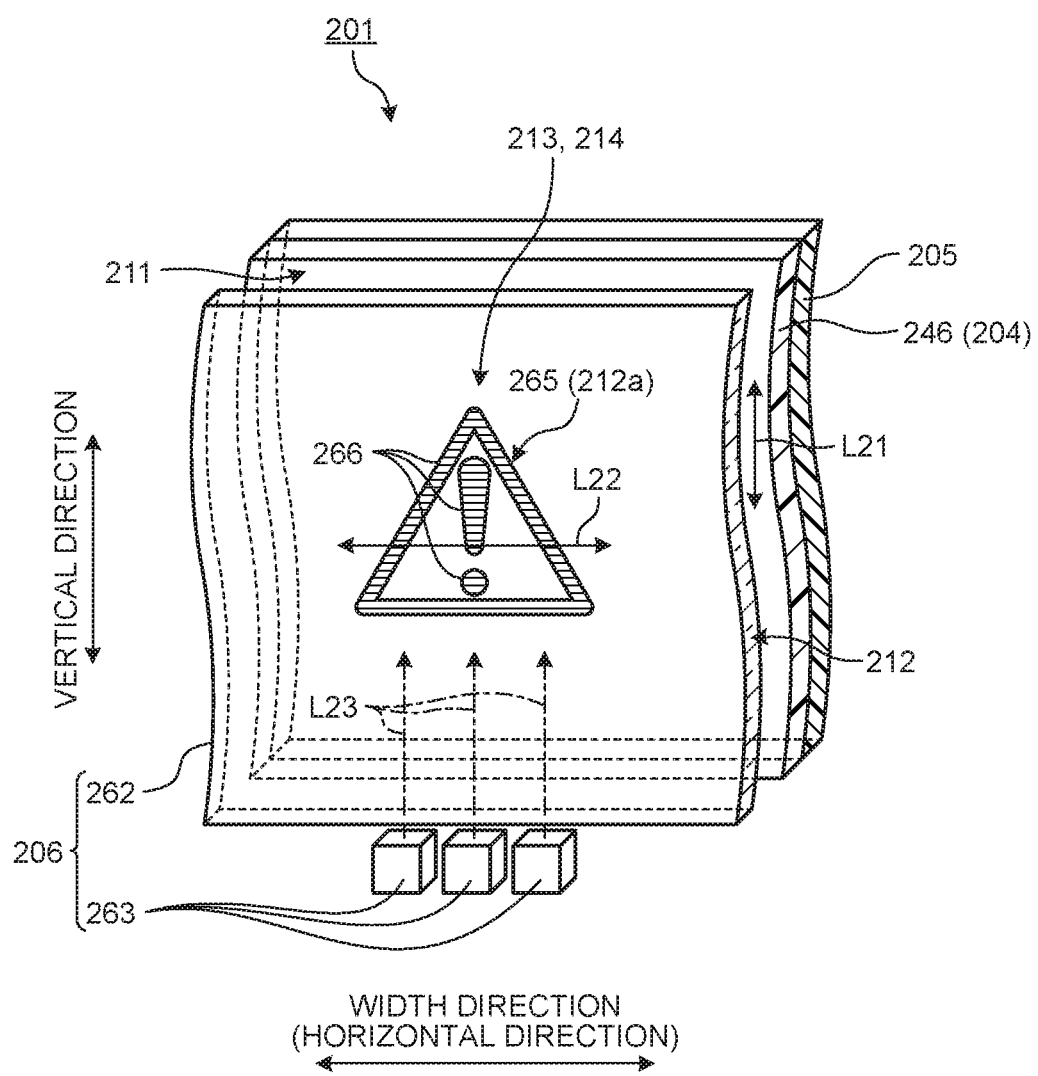
FIG. 22 is a schematic perspective view illustrating a schematic configuration of a front-face side display device of the display device in the second embodiment.
Figure 23:
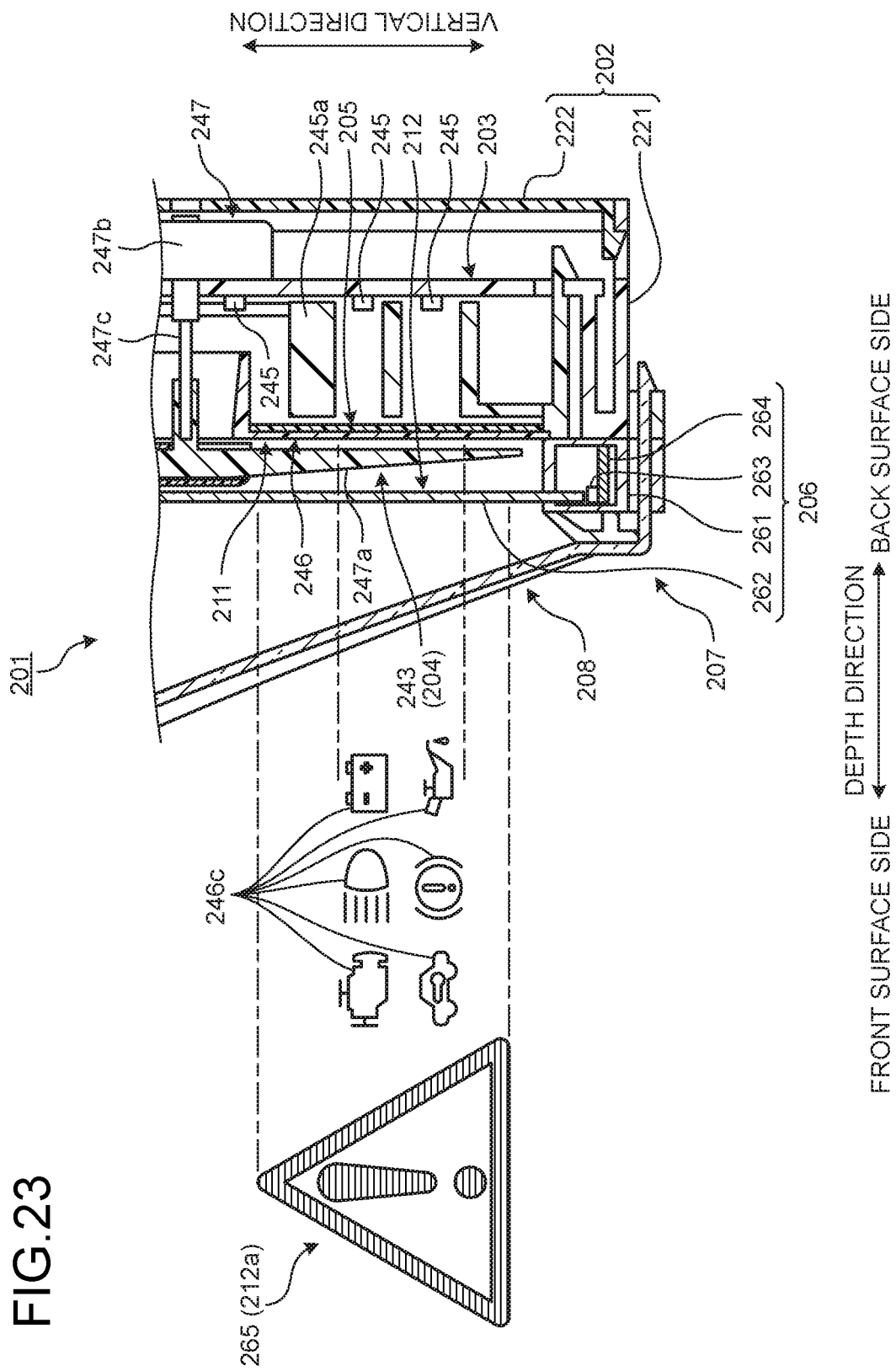
FIG. 23 is a schematic diagram for explaining one example of a display form in the display device in the second embodiment.
Figure 24:
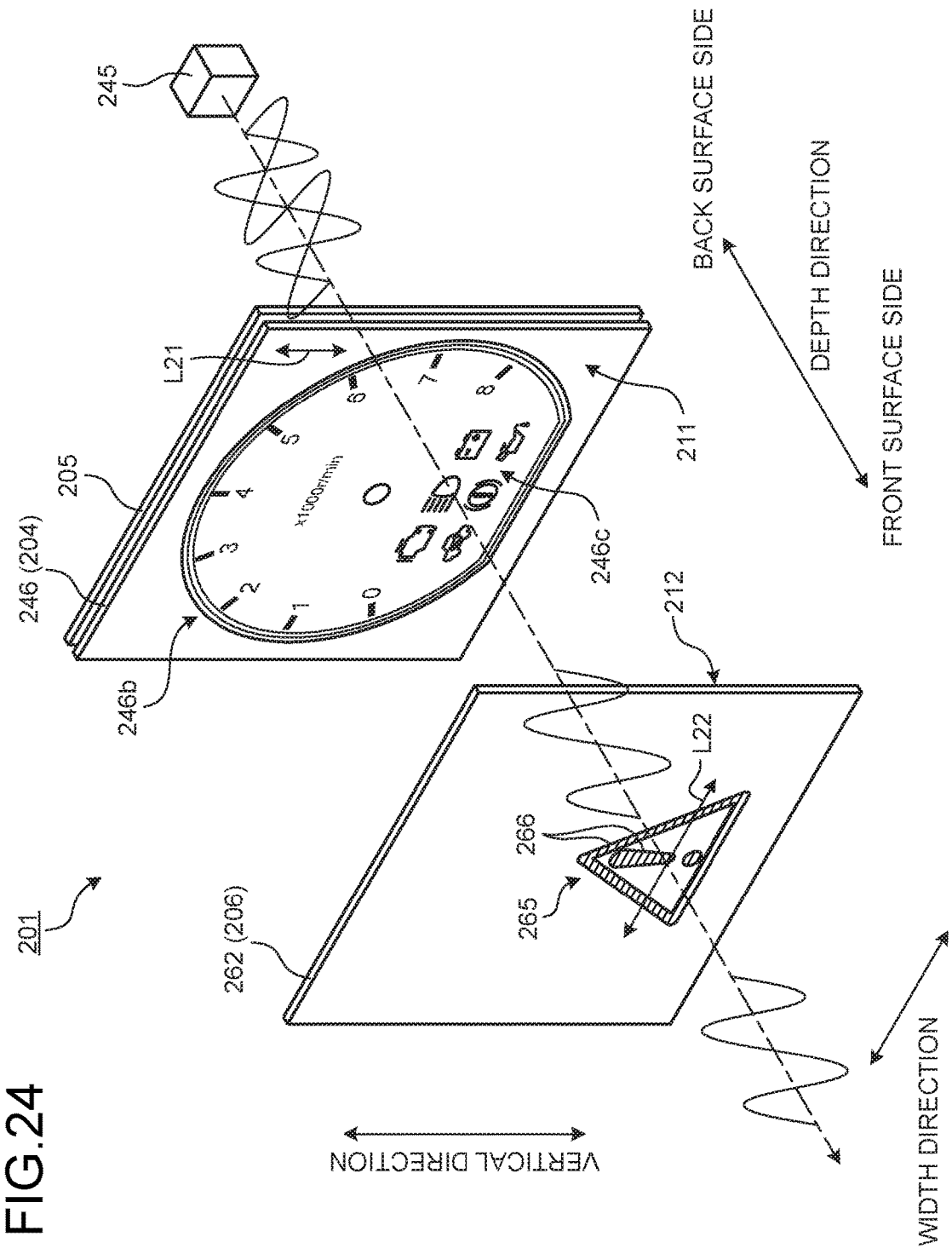
FIG. 24 is a schematic exploded perspective view of the display device in the second embodiment.

FIG. 20 is a front view of the front surface side in a depth direction of a display device according to a second embodiment. FIG. 21 is a cross-sectional view along the line A2-A2 indicated in FIG. 20. FIG. 22 is a schematic perspective view illustrating a schematic configuration of a front-face side display device of the display device in the second embodiment. FIG. 23 is a schematic diagram for explaining one example of a display form in the display device in the second embodiment. FIG. 24 is a schematic exploded perspective view of the display device in the second embodiment. The display device in the second embodiment differs in the configuration of a first display surface from that of the first embodiment. In addition, as for the configurations, operations, and effects that are common to those of the above-described first embodiment, the redundant descriptions are omitted as much as possible.

In a display device 201 in the second embodiment illustrated in FIGS. 20, 21, and 22, a first display surface 211 is structured with analog instruments and the surface (the surface on the front surface side in the depth direction) of the dial plate thereof. The first display surface 211 displays the vehicle information with other than the real image 51a (see FIG. 1 and others) also.

Specifically, the display device 201 includes a case 202, a circuit board 203, a back-surface side display device 204, a polarizing plate 205, a front-face side display device 206, a facing plate 207, and a front glass 208. The display device 201 is structured, being stacked toward the front surface side from the back surface side in the depth direction, with and in order of the case 202, the circuit board 203, the back-surface side display device 204 and the polarizing plate 205, the front-face side display device 206 that serves as a superimposing display device, the facing plate 207, and the front glass 208. In the display device 201 in the second embodiment, the back-surface side display device 204 and the front-face side display device 206 are provided overlapping in the depth direction, and a two-layer type display device is thereby structured.

The case 202 is composed of resin material and the like, and constitutes a part of a housing in which various components composing the display device 201 are assembled and accommodated. The case 202 includes a main body portion 221 and a cover-like portion 222. The main body portion 221 is formed in a substantially rectangular frame-like shape, and both sides in the depth direction are open. The cover-like portion 222 is formed in a substantially rectangular shape, is latched to the surface of the back surface side in the depth direction of the main body portion 221, and closes the opening of the back surface side in the depth direction of the main body portion 221. In the case 202, various components are assembled and accommodated in a space defined with the main body portion 221 and the cover-like portion 222.

Various electronic components and wiring are mounted on the circuit board 203 to implement various functions in the display device 201. The circuit board 203 is assembled to the inside of the case 202 via a fastening member such as a screw.

The back-surface side display device 204 is a display unit located on the back surface side in the depth direction in the display device 201 of a two-layer type, and constitutes the first layer of display surfaces (the first display surface 211 which will be described later) that displays vehicle information. The back-surface side display device 204 includes a display 241, a first analog instrument 242, a second analog instrument 243, turn indicating units 244, first light sources 245 that serve as a main light source, and a dial plate 246. In the back-surface side display device 204, in the case 202, the first analog instrument 242 is arranged on the left side in the width direction, while the second analog instrument 243 is arranged on the right side in the width direction, and between them, the display 241 and the turn indicating units 244 are further arranged. The vehicle information that the back-surface side display device 204 displays may include a variety of driving information concerning the driving, which varies every moment during the driving of the vehicle, such as the speed of vehicle, the output rotation speed of a driving power source, an integrated travel distance, cooling water temperature, remaining fuel, a battery charge amount, an operating status of direction indicators (blinkers), various warnings, a shift position, navigation information, map information, intersection information, and others, for example.

The display 241 is driven and controlled via the circuit board 203 and the like, and on an image display surface 241a, displays images concerning a variety of vehicle information. The image display surface 241a constitutes a substantially rectangular display area in the display 241. As for the display 241, a thin liquid crystal display can be used, for example. However, it is not limited thereto, and a plasma display, an organic EL display, and others can also be used.

The first analog instrument 242 and the second analog instrument 243 have each a pointer 247a as a three-dimensional object, and by the pointer 247a, display various measurement values concerning the vehicle in an analog manner. The pointer 247a is a needle-shaped member to point the current measurement value. As one example, the first analog instrument 242 is a speedometer that displays the speed of the vehicle (vehicle speed) as the information concerning the vehicle, and the second analog instrument 243 is a tachometer that displays the output rotation speed of the driving power source. The first analog instrument 242 and the second analog instrument 243 are of substantially the same configuration. In the first analog instrument 242 and the second analog instrument 243, respective inner mechanisms 247 are secured to the circuit board 203 arranged inside of the case 202. The inner mechanism 247 includes a motor 247b that is a drive source of the pointer 247a, and from the motor 247b, a rotating shaft (rotor shaft) 247c of the pointer 247a is provided in a projecting manner. The rotating shaft 247c projects toward the front surface side along the depth direction. In the first analog instrument 242 and the second analog instrument 243, the central axis of the rotating shaft 247c is the rotating axis of the pointer 247a. The pointer 247a is located on the front surface side in the depth direction of the dial plate 246, and rotates about the central axis of the rotating shaft 247c as the rotating axis. In the first analog instrument 242 and the second analog instrument 243, the pointer 247a rotates as the motor 247b is driven, and in response to various measurement values concerning the vehicle (vehicle speed, revolutions), points a certain location of an indicator portion 246b formed on the dial plate 246.

The turn indicating units 244 represent the operating state of the direction indicators (blinkers).

A plurality of first light sources 245 are mounted on the circuit board 203, and emit light toward the front surface side from the back surface side in the depth direction. Each of the first light sources 245 is composed of an LED element, for example. However, it is not limited thereto. Each of the first light sources 245 is accommodated in a lamp housing 245a and the like formed in the case 202, is mounted on the circuit board 203, and is driven and controlled.

The dial plate 246 is a plate-like member on which various patterns, symbols, strings of characters, and the like that correspond to the vehicle information to be displayed are drawn, and is provided on the front surface side in the depth direction of the first light sources 245. The dial plate 246 is formed in a substantially rectangular shape, and is provided so as to cover a whole of the opening of the surface on the front surface side in the depth direction of the main body portion 221 of the case 202. The dial plate 246 is a polycarbonate sheet of transparent material, and the above-described patterns, symbols, strings of characters, and others are drawn by printing the outlines corresponding to the shapes of the above-described patterns, symbols, strings of characters, and others with the ink of a dark color, for example. The dial plate 246 is irradiated with light from the first light sources 245, and by the irradiated light being transmitted through the portions of the drawn patterns, symbols, strings of characters, and others, the patterns, symbols, strings of characters, and others are displayed being turned on. In the dial plate 246, a substantially rectangular opening 246a is formed in a substantially central portion. In the above-described display 241, the surface of the front surface side thereof is exposed from the dial plate 246 via the opening 246a, and the surface of the front surface side of the display 241 constitutes the above-described substantially rectangular image display surface 241a. The dial plate 246 includes respective indicator portions 246b and various notification symbols 246c that constitute the first analog instrument 242 and the second analog instrument 243 as the patterns, symbols, and strings of characters concerning the vehicle information, for example. In the dial plate 246, the portions of the respective indicator portions 246b and the various notification symbols 246c are the above-described outlined portions, that is, the portions that transmit light. The indicator portion 246b is provided for each of the first analog instrument 242 and the second analog instrument 243, transmits the light emitted from the first light source 245, and is pointed with the pointer 247a. Each of the indicator portions 246b includes a circular ring formed in an arc shape along the rotation locus of the distal end of the pointer 247a, a plurality of scales placed at equal intervals along the circular ring, and the patterns, symbols, strings of characters, and others such as numerals (the strings of characters such as "0," "20," "40," "60," and the strings of characters such as "0," "1," "2," "3") that correspond to measurement values or physical quantity to be displayed. The various notification symbols 246c include what are called various warning lights (warning lamps, what are called telltales) that light up in response to events that need to be warned of, and direction indicator symbols (left and right arrows) that constitute the turn indicating units 244. The notification symbols 246c transmit light emitted from the first light sources 245, and the display and non-display thereof are switched on the basis of the lighting and non-lighting of the first light sources 245. In the dial plate 246, in addition to the foregoing, symbols and the like that represent shift positions (symbols representing "P," "R," "N," "D," "B" and others) may be drawn.

The back-surface side display device 204 displays a variety of vehicle information as the drive control of the display 241, the first light sources 245, and others is performed via the circuit board 203. In the back-surface side display device 204, as each of the first light sources 245 individually lights up, the dial plate 246 is irradiated with light from the back surface side in the depth direction, the irradiated light is transmitted through the portions of the respective indicator portions 246b and the various notification symbols 246c, and the respective indicator portions 246b and the various notification symbols 246c are lighted up individually. Meanwhile, in the back-surface side display device 204, as each of the first light sources 245 is individually put out, the respective indicator portions 246b and the various notification symbols 246c are put out individually. That is, the back-surface side display device 204 constitutes an indicator light type display unit in which the display and non-display of the portions of the respective indicator portions 246b and the various notification symbols 246c are switched depending on the lighting and non-lighting of the respective first light sources 245. Furthermore, the back-surface side display device 204 can also make the pointer 247a itself emit light by the first light source 245.

Then, in the back-surface side display device 204, the surface on the front surface side in the depth direction of the dial plate 246 constitutes the first display surface 211 that is the first layer of the display surfaces that displays vehicle information. The first display surface 211, as in the foregoing, is the display surface that displays the vehicle information by transmitting the light emitted from the first light source 245 in a certain shape. The first display surface 211 includes the indicator portions 246b pointed by the pointer 247a that transmits light emitted from the first light source 245 and is rotated by the rotating shaft 247c, and includes the notification symbols 246c and others that transmit light emitted from the first light sources 245 and for which the display and non-display are switched on the basis of the lighting and non-lighting of the first light sources 245.

The polarizing plate 205 is provided between the first light sources 245 and a later-described second display surface 212 of the front-face side display device 206, and changes the light emitted toward the second display surface 212 from the first light sources 245 into light that is polarized in one direction. The polarizing plate 205 is formed in a substantially rectangular shape, and is provided on the surface of the back surface side in the depth direction of the dial plate 246. The polarizing plate 205, by aligning light that is emitted from the first light sources 245 with the polarization direction L21 (see FIG. 22 and others) as a transmission axis direction and emitting the light for which the vibration direction lies along the polarization direction L21 (transmission axis direction), emits the light that is polarized in one direction toward the second display surface 212 side. The polarization direction L21 of the light that is polarized by the polarizing plate 205 is defined as the direction that lies along the vertical direction. The polarizing plate 205 is not limited to a substantially rectangular shape, and may be changed as appropriate depending on the display device.

The front-face side display device 206, as illustrated in FIGS. 20, 21, and 22, is a display unit located on the front surface side in the depth direction in the display device 201 of a two-layer type, and constitutes the second layer of the display surfaces (the second display surface 212 which will be described later) that displays a certain pattern. The front-face side display device 206 includes a transparent light guide plate 262 that is provided overlapping the dial plate 246 and others of the back-surface side display device 204 (that is, the first display surface 211 which will be described later), transmits light emitted from the first light sources 245 that are the light sources of the back-surface side display device 204, and also has grooves 266 constituting a pattern 265 (a real image pattern 212a) formed thereon, and includes second light sources 263 as a light source for grooves which irradiate the end surface of the transparent light guide plate 262 with light, and the display and non-display of the pattern 265 are switched on the basis of the lighting and non-lighting of the second light sources 263. Specifically, the front-face side display device 206 includes a frame-shaped receiving portion 261, the transparent light guide plate 262, the second light sources 263, and a circuit board 264.

The frame-shaped receiving portion 261 is formed in a substantially rectangular frame-like shape, is assembled on the front surface side in the depth direction of the main body portion 221 of the case 202, and receives and holds the end portion of the transparent light guide plate 262. The transparent light guide plate 262 is provided overlapping the front surface side in the depth direction of the dial plate 246 constituting the back-surface side display device 204, that is, on the front surface side in the depth direction of the first display surface 211. The transparent light guide plate 262 is formed by a transparent member (transparent medium) having transparency that transmits the light emitted from the first light sources 245. More precisely, the transparent light guide plate 262 is arranged on the front surface side in the depth direction of the above-described polarizing plate 205, and the light that is transmitted through the polarizing plate 205 and is polarized in the polarization direction L21, that is, the light of the vibration direction along the polarization direction L21 (transmission axis direction) is incident thereon. In the transparent light guide plate 262, the end portion is held by the frame-shaped receiving portion 261. On the transparent light guide plate 262, fine grooves 266 that constitute a pattern (display design) 265 are formed. The grooves 266 constituting the pattern 265 may be formed to be in recessed shapes on a principal surface of the transparent light guide plate 262, that is, the principal surface of the back surface side of the transparent light guide plate 262, by resin-molding the transparent light guide plate 262 by using a mold having projecting shapes corresponding to the grooves 266, for example. Furthermore, the grooves 266 constituting the pattern 265 may be formed to be in recessed shapes on the principal surface of the transparent light guide plate 262, that is, the principal surface of the back surface side of the transparent light guide plate 262, by engraving in various methods such as laser beam machining, for example. As for the pattern 265 formed on the transparent light guide plate 262 by the grooves 266, various patterns such as those related to the vehicle information and others that are displayed on the back-surface side display device 204 may be included, for example. In the example in FIGS. 20, 22, 23, and 24, the pattern 265 is "caution mark (an icon imitating an exclamation mark inside a triangle)," for example. However, it is not limited thereto. A plurality of fine grooves 266 are formed along the width direction. That is, an extending direction L22 of the grooves 266 is the direction along the width direction. The second light sources 263 irradiate the end surface of the transparent light guide plate 262 with light. The second light sources 263 are composed of LED elements, for example. However, they are not limited thereto. The second light sources 263 are arranged so that the optical axis direction thereof, that is, an irradiation direction L23 of the light is orthogonal to the end surface of the transparent light guide plate 262, and so that the irradiated light enters from the end surface of the transparent light guide plate 262. A plurality of second light sources 263 are provided, at equal intervals along the width direction, at the locations that are opposite to the lower end surface in the vertical direction of the transparent light guide plate 262, and three pieces of the second light sources 263 are provided here. Each of the second light sources 263 is arranged such that the optical axis direction thereof lies along the vertical direction, and thus the irradiation direction L23 of the light by the second light sources 263 is the direction along the vertical direction. Here, the above-described extending direction L22 of the grooves 266 and the irradiation direction L23 of the light (in other words, the optical axis direction) are orthogonal to each other. Each of the second light sources 263 is arranged at a location hidden by the facing plate 207, which will be described later, when viewed from the front surface side, for example. The circuit board 264 is electrically connected to the respective second light sources 263 and the main circuit board 203. The respective second light sources 263 are driven and controlled via the circuit board 203, the circuit board 264, and others. In the respective second light sources 263, typically, the lighting and non-lighting can be switched individually. The extending direction L22 of the grooves 266, the irradiation direction L23 of the light by the second light sources 263, and others will be described in detail later.

In the front-face side display device 206 configured as in the foregoing, the respective second light sources 263 are driven and controlled via the circuit board 203, the circuit board 264, and the like, and the display and non-display of the pattern 265 are thereby switched on the basis of the lighting and non-lighting of the second light sources 263. In the front-face side display device 206, when the second light sources 263 are lighted, the pattern 265 is in a state of emitting light and being displayed. That is, the light emitted from the second light sources 263 is incident on the end surface of the transparent light guide plate 262 and propagates in the transparent light guide plate 262, and at least a part of the components of the incident light reflected at the grooves 266 constituting the pattern 265 toward the front surface side, and as a result, the pattern 265 is in a state where it can be visually recognized by the driver and the like. In this case, when the driver views it from the front surface side (driver's seat side), as illustrated in FIGS. 20, 23, and others, by superimposing the pattern 265 displayed on the transparent light guide plate 262 onto the vehicle information (for example, the indicator portion 246b, the notification symbols 246c, and pointers 247a which are displayed on the first display surface 211) displayed on the back-surface side display device 204 that is located on the back surface side of the transparent light guide plate 262, the front-face side display device 206 forms a certain design. This enables a variety of display to be made. Meanwhile, when the second light sources 263 are put out, the front-face side display device 206 is in a state where the pattern 265 is not displayed and is in a state where the driver and the like can visually recognize easily a variety of vehicle information (for example, the indicator portion 246b, the notification symbols 246c, and the pointers 247a which are displayed on the first display surface 211) displayed on the first display surface 211 and others by the light that is irradiated from the first light sources 245 and others and transmitted through the transparent light guide plate 262.

The facing plate 207 is a frame-shaped member that surrounds the peripheries of the dial plate 246 of the back-surface side display device 204, the frame-shaped receiving portion 261 of the front-face side display device 206, the transparent light guide plate 262, and others and fastens the dial plate 246, the transparent light guide plate 262, and others. The facing plate 207 is assembled to the case 202.

The front glass 208 is a protective member having optical transparency that transmits light, and is assembled to the facing plate 207.

The first layer of the display surfaces composed of the back-surface side display device 204 as in the foregoing constitutes the first display surface 211 that displays vehicle information. Meanwhile, the second layer of the display surfaces composed of the front-face side display device 206 as in the foregoing constitutes the second display surface 212 that is provided overlapping the first display surface 211 and transmits light, and also includes the pattern 265 and is capable of switching between a display state of displaying the pattern 265 and a non-display state of not displaying the pattern 265. The first display surface 211 and the second display surface 212 constitute a plurality of display surfaces overlapped in the depth direction, that is, the vehicle travel direction. The first display surface 211 constitutes the display surface of the back side in the vehicle travel direction of the display surfaces and the second display surface 212 constitutes the display surface of the near side (viewing position side of a viewer such as a driver) in the vehicle travel direction of the display surfaces.

More specifically, the first display surface 211, as in the foregoing, is composed of the surface on the front surface side in the depth direction of the dial plate 246 that composes the back-surface side display device 204. That is, the first display surface 211 is a display surface that includes the display area such as the indicator portions 246b that compose the first analog instrument 242 and the second analog instrument 243, and the notification symbols 246c.

Meanwhile, the second display surface 212 is constructed by the principal surface of the back surface side in the depth direction of the transparent light guide plate 262 on which the grooves 266 constituting the pattern 265 are formed. In the second display surface 212, the display state and non-display state can be switched according to the lighting and non-lighting of the respective second light sources 263 regardless of the status of the first display surface 211. The display state of the second display surface 212 means a state of displaying the real image pattern 212a by the light emitted from the second light sources 263. The real image pattern 212a is the above-described pattern 265, and is the above-described "caution mark," for example. Meanwhile, the non-display state of the second display surface 212 means a state of not displaying the real image pattern 212a (pattern 265) by putting out the second light sources 263.

Then, the display device 201 in the second embodiment, as illustrated in FIGS. 22, 24, and others, is constructed such that the polarization direction L21 of the polarizing plate 205 and the extending direction L22 of the grooves 266 constituting the pattern 265 intersect at a certain angle range. This enables proper visibility to be ensured, in addition to achieving a variety of display by combining the back-surface side display device 204 and the front-face side display device 206. The polarization direction L21 of the polarizing plate 205, typically, corresponds to the polarization direction (transmission axis direction) of the light that is polarized by the polarizing plate 205, and the extending direction of the grooves 266, typically, corresponds to the direction in which the grooves 266 extend.

As illustrated in FIG. 24, in the display device 201, the direction of electric field of the light emitted from the first light sources 245, typically, vibrates in all directions. The polarizing plate 205 transmits, of the light emitted from the first light sources 245, only the electric field of the component of the polarization direction L21, that is, the vertical direction. This means that the polarizing plate 205 defines the vertical direction that is the polarization direction L21 as the transmission axis direction, and transmits the light that vibrates in the transmission axis direction, while blocking off the light that vibrates in the absorption axis direction orthogonal to the transmission axis direction. In other words, the direction of the electrical field of the light transmitted through the polarizing plate 205 is aligned to the transmission axis direction of the polarizing plate 205, that is, the vertical direction that is the polarization direction L21. Then, in the display device 201, the light for which the vibration direction is along the transmission axis direction (polarization direction) of the polarizing plate 205, that is, the vertical direction which is the polarization direction L21, is incident on the dial plate 246 constituting the back-surface side display device 204 and the transparent light guide plate 262 constituting the front-face side display device 206. That is, in the display device 201, the light that is transmitted through the polarizing plate 205 and is polarized in the polarization direction L21 is incident on the dial plate 246, and the incident light is transmitted through the portions of the respective indicator portions 246b and the notification symbols 246c and is emitted toward the transparent light guide plate 262 side. Then, in the display device 201, the light that is transmitted through the polarizing plate 205, is polarized in the polarization direction L21, and is transmitted through the portions of the respective indicator portions 246b and the notification symbols 246c of the dial plate 246 is incident on the transparent light guide plate 262, and the incident light is transmitted through the transparent light guide plate 262 and is emitted toward the front surface side in the depth direction.

Then, it is preferable that a plurality of fine grooves 266 constituting the pattern (display design) 265 be formed so that, for example, as the same as the above-described grooves 5d (see FIG. 4 and others), the grooves are in a substantially V-shaped cross-sectional shape and that the pitch thereof is 1 μm or smaller, and is preferably 0.5 μm or smaller (the lower limit is a size that can be manufactured, for example). Furthermore, each groove 266 is formed as a straight groove extending in one direction. The transparent light guide plate 262 is structured so that the transmittance of the material in the area of the pattern 265 and the transmittance of the material of the area in the periphery of the pattern 265 in the transparent light guide plate 262 are equal. The fine grooves 266 formed on the transparent light guide plate 262, as the same as that of the above-described grooves 5d (see FIG. 4 and others), present an effect similar to that of a polarizing plate.

The display device 201 in the second embodiment, by superimposing the grooves 266 formed on the transparent light guide plate 262 constituting the second display surface 212 on the first display surface 211 constituted by back-surface side display device 204, and utilizing the fact that the transmitted light being transmitted through the area in which the grooves 266 are formed changes according to the relation between the polarization direction L21 (transmission axis direction) of the polarizing plate 205 and the extending direction L22 of the grooves 266, achieves the structure that the grooves 266 constituting the pattern 265 on the transparent light guide plate 262 are hard to be visually recognized when the pattern 265 (the real image pattern 212a) on the transparent light guide plate 262 is made not to be displayed.

Specifically, the relation between the polarization direction L21 of the polarizing plate 205 and the extending direction L22 of the grooves 266 constituting the pattern 265 is set so that the relation is substantially equivalent to the relation between the above-described polarization direction L2 of the display 3 and the extending direction L3 of the grooves 5d. That is, the display device 201 in the second embodiment is constructed such that the polarization direction L21 of the polarizing plate 205 and the extending direction L22 of the grooves 266 constituting the pattern 265 intersect at the angle range of 75° to 105°. When an angle formed by the polarization direction (transmission axis direction) L21 of the polarizing plate 205 and the extending direction L22 of the grooves 266 constituting the pattern 265 is defined as angle θ, the grooves 266 are formed on the transparent light guide plate 262 such that the angle θ satisfies the conditional expression of 75°≤θ≤105°. That is, the polarization direction L21 and the extending direction L22 intersect by having a certain angle θ within the range of 75° to 105°. More preferably, the polarization direction L21 and the extending direction L22 intersect by having a certain angle θ within the range of 85° to 95°. Here, the polarization direction L21 of the polarizing plate 205 and the extending direction L22 of the grooves 266 constituting the pattern 265 are orthogonal to each other.

The display device 201 configured as in the foregoing is constructed such that the polarization direction L21 of the polarizing plate 205 and the extending direction L22 of the grooves 266 are orthogonal to each other (θ=90°), in other words, such that the polarization direction L21 of the polarizing plate 205 and the transmission axis direction of the grooves 266 are in parallel. Accordingly, in the display device 201, in a state where the second light sources 263 are put out, the area inside the pattern 265 transmits, as the same as the area outside of the pattern 265, almost all of the light from the first light sources 245. As a result, the display device 201 is in a state where the amplitude of the transmitted light of the area of the pattern 265 and that of the area in the periphery of the pattern 265 are substantially equal and there is substantially no difference between the luminance of the area of the pattern 265 and that of the area in the periphery of the pattern 265. That is, in the display device 201, as the same as the above-described display device 1, the luminance ratio of the area of the pattern 265 to the area in the periphery of the pattern 265 is maximized, and thus the area of the pattern 265 is hardly noticeable against the area in the periphery of the pattern 265 and the pattern 265 can be made hard to be visually recognized. In the display device 201, as the same as the above-described display device 1, because the luminance ratio of the area of the pattern 265 to the area in the periphery of the pattern 265 falls within a certain luminance ratio range if the angle θ between the polarization direction L21 of the polarizing plate 205 and the extending direction L22 of the grooves 266 is within the range of 75°≤θ≤105° (preferably 85°≤θ≤95°), the pattern 265 can be maintained in a state of being hard to be visually recognized. The certain luminance ratio range is a range of 90% to 100%, more preferably a range of 92.5% to 100%, for example. That is, in the display device 201, the polarization direction L21 of the polarizing plate 205 and the extending direction L22 of the grooves 266 are structured so as to intersect at the angle range of 75° to 105°, more preferably at the angle range of 85° to 95°, and the polarization direction L21 of the polarizing plate 205 and the extending direction L22 of the grooves 266 can thereby be structured so as to intersect at an angle range in which the luminance ratio of the luminance of the area of the pattern 265 to the luminance of the area in the periphery of the pattern 265 in the transparent light guide plate 262 becomes 90% to 100%.

Furthermore, the display device 201 in the second embodiment, as illustrated in FIG. 22 and others, is structured so that the extending direction L22 of the grooves 266 and the irradiation direction L23 of the light by the second light sources 263 of the front-face side display device 206 are orthogonal to each other. That is, the polarization direction L21 of the polarizing plate 205 and the irradiation direction L23 of the light by the second light sources 263 are the directions along the vertical direction, and the extending direction L22 of the grooves 266 is the direction along the horizontal direction. In the second embodiment, three pieces of the second light sources 263 are provided, at equal intervals along the width direction (horizontal direction), at the locations that are on the lower side in the vertical direction of the area on which the pattern 265 is formed and are opposite to the end surface of the lower side in the vertical direction of the transparent light guide plate 262, and the second light sources 263 irradiate light toward the upper side in the vertical direction. Each of the second light sources 263 is arranged at a location hidden by the facing plate 207 and others, when viewed from the front surface side, for example.

In the second display surface 212 configured as in the foregoing, on the principal surface of the back surface side of the transparent light guide plate 262, a plurality of fine grooves 266 are formed so that the polarization direction L21, the extending direction L22, the irradiation direction L23, and others are in the positional relation as in the foregoing, and a display structure 213 of the real image pattern 212a (the pattern 265) and a non-display structure 214 are thereby constructed (see FIG. 22 and others).

The display structure 213 of the second display surface 212 is a structure to form the real image pattern 212a (the pattern 265) by the light emitted from the second light sources 263 in the display state of the second display surface 212. The display structure 213 is the structure to form, in the display state of the second display surface 212, the real image pattern 212a by reflecting the light emitted from the second light sources 263 at the fine grooves 266 formed as an uneven portion on the surface of the transparent light guide plate 262 that is a member constituting the second display surface 212. Accordingly, the display structure 213 can be in a state where the driver and the like can visually recognize the pattern 265 on the second display surface 212.

Meanwhile, the non-display structure 214 of the second display surface 212 is a structure that makes the real image pattern 212a (the pattern 265) hard to be visually recognized, in the non-display state of the second display surface 212. The non-display structure 214 makes the real image pattern 52a hard to be visually recognized in the non-display state of the second display surface 212 as compared with at least the display state. More precisely, the non-display structure 214 of the second display surface 212 is a structure to make the fine grooves 266 hard to be visually recognized in the non-display state of the second display surface 212 after making the second light sources 263 in a non-lighting state. The non-display structure 214 is a structure (a structure of intersecting angle between the extending direction of the grooves and the polarization direction) that makes the pattern 265 hard to be visually recognized by putting out the second light sources 263, and that further makes the grooves 266 themselves hard to be recognized in the non-display state by forming the grooves 266 such that the polarization direction of light emitted from the first display surface 211 side toward the second display surface 212 side, specifically in this example, the polarization direction L21 of the polarizing plate 205 and the extending direction L22 of the grooves 266 constituting the real image pattern 212a (the pattern 265) intersect at a certain angle range, typically, at the angle range of 75° to 105° as in the foregoing. Accordingly, the non-display structure 214 makes the amplitude of the transmitted light of the area of the real image pattern 212a on the second display surface 212, and that of the area in the periphery of the real image pattern 212a be substantially equal, and can achieve a state in which there is substantially no difference in the luminance between the area of the real image pattern 212a, and the area in the periphery of the real image pattern 212a. Thus, in the non-display state, the real image pattern 212a and the fine grooves 266 as an uneven portion constituting the real image pattern 212a can be made hard to be visually recognized.

According to the display device 201 described in the foregoing, included are the first display surface 211 that displays vehicle information by the light emitted from the first light sources 245; the second display surface 212 that is provided overlapping the first display surface 211 and transmits light, and also has the grooves 266 constituting the pattern 265 (the real image pattern 212a) formed thereon and is capable of switching between the display state of displaying the pattern 265 by the light emitted from the second light sources 263 and the non-display state of not displaying the pattern 265 by putting out the second light sources 263; and the polarizing plate 205 that is provided between the first light sources 245 and the second display surface 212 and that changes the light that is emitted toward the second display surface 212 from the first light sources 245 into the light that is polarized in one direction. The polarization direction L21 of the light that is polarized by the polarizing plate 205 and the extending direction L22 of the grooves 266 intersect. Here, the first display surface 211 displays the vehicle information by transmitting the light emitted from the first light sources 245 in a certain shape (the indicator portions 246b, the notification symbols 246c, and others).

Accordingly, the display device 201 can display the vehicle information displayed on the first display surface 211 by the light emitted from the first light sources 245, that is, the vehicle information displayed by the first analog instrument 242, the second analog instrument 243, and others, in combination with the real image pattern 212a (the pattern 265) that is displayed on the second display surface 212 that is provided overlapping the first display surface 211 and transmits light. The display device 201 is structured such that the polarization direction L21 of the light emitted from the first light sources 245 and polarized by the polarizing plate 205 and the extending direction L22 of the grooves 266 constituting the real image pattern 212a intersect at a certain angle range. Thus, when the real image pattern 212a is made not to be displayed, the luminance ratio that represents the ratio of the luminance of the area of the real image pattern 212a to the luminance of the area in the periphery of the real image pattern 212a in the second display surface 212 can be made relatively large. Accordingly, when the second light sources 263 are put out and the real image pattern 212a on the second display surface 212 constituted by the grooves 266 is made not to be displayed, the display device 201 can make the grooves 266, which constitute the real image pattern 212a on the second display surface 212, hard to be visually recognized, and can suppress the visibility of the vehicle information displayed on the first display surface 211 from being disturbed. As a result, the display device 201 can ensure proper visibility, in addition to achieving a variety of display, for example.

In more detail, according to the display device 201 described in the foregoing, the polarization direction L21 of the light that is polarized by the polarizing plate 205 and the extending direction L22 of the grooves 266 intersect at the angle range of 75° to 105°. Thus, according to the display device 201, in a state where the second light sources 263 are put out and where the vehicle information is displayed on the first display surface 211, the polarization direction L21 of the polarizing plate 205 and the extending direction L22 of the grooves 266 are structured so as to intersect at an angle range in which the luminance ratio of the luminance of the area of the pattern 265 to the luminance of the area in the periphery of the pattern 265 in the transparent light guide plate 262 is of 90% to 100%. Note that the transparent light guide plate 262 is structured so that the transmittance of the material in the area of the pattern 265 and the transmittance of the material of the surrounding area of the pattern 265 are equal. The polarization direction L21 of the light that is polarized by the polarizing plate 205 and the extending direction L22 of the grooves 266 are orthogonal to each other. Thus, when the pattern 265 on the transparent light guide plate 262 is made not to be displayed, the display device 201 can maximize the luminance ratio of the area of the pattern 265 to the area in the periphery of the pattern 265. Accordingly, when the pattern 265 on the transparent light guide plate 262 is made not to be displayed, the display device 201 can reliably make the grooves 266 hard to be visually recognized, and can reliably suppress the visibility of the vehicle information displayed on the first display surface 211 from being disturbed.

Furthermore, according to the display device 201 described in the foregoing, as a certain shape that indicates the vehicle information, the first display surface 211 includes the indicator portions 246b that are pointed by the pointer 247a and that transmits light emitted from the first light source 245 and is rotated by the rotating shaft 247c, or includes the notification symbols 246c and others that transmit light emitted from the first light source 245 and for which the display and non-display are switched on the basis of the lighting and non-lighting of the first light source 245. Thus, in addition to displaying, on the first display surface 211, the indicator portions 246b pointed by the pointers 247a, the notification symbols 246c, and others as the vehicle information, the display device 201 can make the vehicle information seen through the transparent light guide plate 262 of the background in a non-display state of the second display surface 212, and can make the design of the pattern 265 appear by turning the second display surface 212 into a displaying state as needed.

Moreover, according to the display device 201 described in the foregoing, the extending direction L22 of the grooves 266 and the irradiation direction L23 of the light by the second light sources 263 are orthogonal to each other. Accordingly, the display device 201 can make the light from the second light sources 263 substantially perpendicularly incident on the grooves 266 constituting the pattern 265. Thus, the display device 201 can, when displaying the pattern 265 on the transparent light guide plate 262, relatively increase the amount of the light reflected at the grooves 266 toward the front surface side (driver's seat side), and can clearly display the pattern 265.

In the foregoing description, it has been exemplified that the back-surface side display device 204 includes the display 241, the first analog instrument 242, the second analog instrument 243, the turn display units 244, and the dial plate 246, and constitutes the first display surface 211. However, it is not limited to the combination of the foregoing.

In the foregoing description, it has been exemplified that the polarizing plate 205 is provided on the surface of the back surface side in the depth direction of the dial plate 246. However, it is not limited thereto, and it only needs to be provided between the first light sources 245 and the second display surface 212. The polarizing plate 205 may be provided on the surface of the front surface side in the depth direction of the dial plate 246, or may be provided on the surface of the back surface side in the depth direction of the transparent light guide plate 262, for example.

The display device 201 described in the foregoing is structured such that the polarization direction L21 of the polarizing plate 205 and the extending direction L22 of the grooves 266 intersect at the angle range of 75° to 105°. In other words, they only need to be structured to intersect at an angle range in which the luminance ratio of the luminance of the area of the pattern 265 to the luminance of the area in the periphery of the pattern 265 in the transparent light guide plate 262 is of 90% to 100%. In the display device 201, the polarization direction L21 of the polarizing plate 205 may be inclined with respect to the vertical direction. Even in this case, the polarization direction L21 of the polarizing plate 205 and the extending direction L22 of the grooves 266 only need to be in the relation as in the foregoing.

In the foregoing description, it has been described that three pieces of the second light sources 263 are to be provided, at equal intervals along the width direction (horizontal direction), at the locations that are on the lower side in the vertical direction of the area on which the pattern 265 is formed and are opposite to the end surface of the lower side in the vertical direction of the transparent light guide plate 262, and that the second light sources 263 are to irradiate light toward the upper side in the vertical direction. However, the second light sources 263 are not limited thereto, and may be provided on the upper side in the vertical direction of the transparent light guide plate 262 or may be provided on the lateral side in the width direction of the transparent light guide plate 262.

In the foregoing description, it has been exemplified that the grooves 266 constituting the pattern 265 are formed on the principal surface of the back surface side in the depth direction of the transparent light guide plate 262, and that the principal surface of the back surface side in the depth direction of the transparent light guide plate 262 constitutes the second display surface 212. However, they are not limited thereto. For example, the grooves 266 constituting the above-described pattern 265 may be formed on the principal surface of the front surface side in the depth direction of the transparent light guide plate 262, and the principal surface of the front surface side in the depth direction of the transparent light guide plate 262 may constitute the second display surface 212. As for the pattern 265, it may be the indicator portions 246b, the notification symbols 246c, and others that have been exemplified to be formed on the dial plate 246.

Third Embodiment

Figure 25:
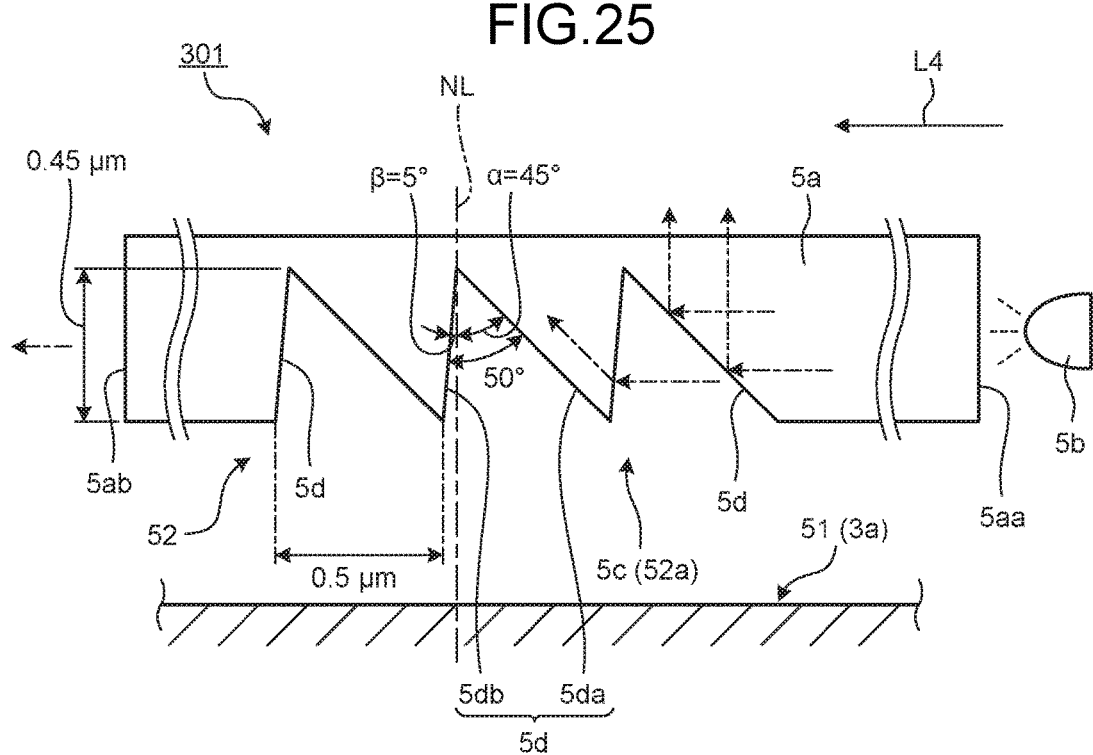
FIG. 25 is a schematic cross-sectional view illustrating a schematic configuration of a display device according to a third embodiment.
Figure 26:
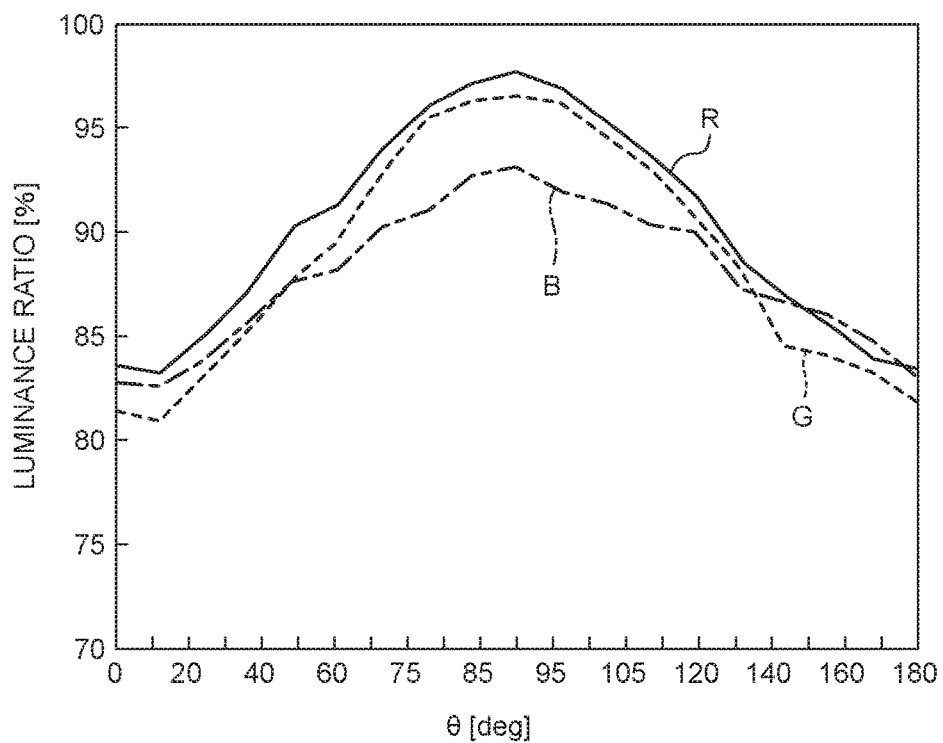
FIG. 26 is a chart representing the result of luminance measurement test.

FIG. 25 is a schematic cross-sectional view illustrating a schematic configuration of a display device according to a third embodiment. FIG. 26 is a chart representing the result of a luminance measurement test. The display device in the third embodiment differs in the shape of the grooves from that of the first embodiment.

A display device 301 in the third embodiment, as illustrated in FIG. 25, differs in the shape of a plurality of grooves 5d constituting the pattern 5c (the real image pattern 52a) from the one described in the foregoing. The grooves 5d in the third embodiment are formed such that, as in the foregoing, the bottom portions form an angle by the first groove forming surface 5da that lies along the extending direction L3, and the second groove forming surface 5db that lies along the extending direction L3 and is connected to the first groove forming surface 5da. The angle of the bottom portion of the groove 5d is, as the same as that in the foregoing, not the angle of the apex portion of the surface side of the transparent light guide plate 5a (in other words, the angle of the apex portion of the first display surface 51 side) but the angle of the bottom portion sunken from the surface of the transparent light guide plate 5a (in other words, the angle of the bottom portion away from the first display surface 51), and is the angle of the front surface side in the depth direction (the angle of the upper side in FIG. 25). The groove 5d in the third embodiment is formed asymmetrical to the normal line NL as a center line of the surface on which the groove 5d is formed (the principal surface on the back surface side of the transparent light guide plate 5a), in a cross-sectional view orthogonal to the extending direction L3. That is, in a cross-sectional view orthogonal to the extending direction L3, the groove 5d is formed in a scalene triangular cross-sectional shape. In more detail, the groove 5d in the third embodiment is formed such that the first groove forming surface angle α is greater than the second groove forming surface angle β(α>β). As one example, the groove 5d is formed to the first groove-forming surface angle α=45° and the second groove-forming surface angle β=5°.

In a member on which the grooves 5d in the third embodiment are formed, that is, in the transparent light guide plate 5a, it is preferable that the light that is not reflected at the grooves 5d, out of the light that has entered from an incident end surface 5aa on which the light from the light sources 5b is incident, be emitted via an end surface 5ab that is opposite to the incident end surface 5aa in the irradiation direction L4 of the light by the light sources 5b. That is, in the transparent light guide plate 5a, it is preferable that a reflector and the like be not provided on the end surface 5ab that is opposite to the incident end surface 5aa in the irradiation direction L4. Accordingly, in the display device 301, the light that has entered from the incident end surface 5aa, passed once through the portion in which grooves 5d are formed, and reached the end surface 5ab can be suppressed from being reflected and propagating again toward the portion in which the grooves 5d are formed.

According to the display device 301 in the foregoing, the grooves 5d are formed such that the bottom portions form an angle by the first groove forming surface 5da that lies along the extending direction L3, and the second groove forming surface 5db that lies along the extending direction L3 and is connected to the first groove forming surface 5da; and the light sources 5b are located on the first groove forming surface 5da side and the surface on which the groove 5d is formed is opposite to the first display surface 51, and when an angle, in a cross-sectional view orthogonal to the extending direction L3, that is formed by the normal line NL of the surface, on which the groove 5d is formed, and the first groove forming surface 5da and located on the first display surface 51 side and the opposite side of the second groove forming surface 5db side is defined as the first groove-forming surface angle α and when an angle, in a cross-sectional view orthogonal to the extending direction L3, that is formed by the normal line NL and the second groove forming surface 5db and located on the first display surface 51 side and the opposite side of the first groove forming surface 5da side is defined as the second groove-forming surface angle β, the first groove-forming surface angle α is greater than the second groove-forming surface angle β.

Accordingly, in the display device 301, the first groove-forming surface angle α is formed greater than the second groove-forming surface angle β and the groove 5d is formed asymmetrical with respect to the normal line NL as the center line. Thus, due to the geometrical positional relation between the first groove forming surface 5da and the second groove forming surface 5db, as compared with the case in which the first groove-forming surface angle α and the second groove-forming surface angle β are formed to be equal (a case in which the groove 5d is symmetrical with respect to the normal line NL as the center line), the amount of the light that has entered again via the second groove forming surface 5db, out of the light that has entered from the light sources 5b on the first groove forming surface 5da side and that emitted once from the first groove forming surface 5da, can be relatively increased, for example. Thus, while relatively increasing the amount of the light that is directed toward the front surface side in the depth direction from the second display surface 52 side, the display device 301 can suppress the amount of the light that is directed toward the back surface side in the depth direction, that is, the amount of the light that is directed toward the first display surface 51 (the image display surface 3a) side.

Furthermore, in the display device 301, because the first groove-forming surface angle α is formed greater than the second groove-forming surface angle β and the groove 5d is made asymmetrical with respect to the normal line NL as the center line, the depth in the depth direction of each groove 5d can be made relatively deeper geometrically, as compared with the case in which the pitch of each groove 5d is fixed to the same pitch as the case in which the first groove-forming surface angle α and the second groove-forming surface angle β are formed to be equal (in the example in FIG. 25, 0.5 μm as the same as in FIG. 14). Accordingly, because the area of the first groove forming surface 5da located on the light sources 5b side can be ensured to be relatively wide, while relatively increasing the amount of the light that has entered from the light sources 5b on the first groove forming surface 5da side, reflected at the first groove forming surface 5da, and is directed toward the front surface side in the depth direction from the second display surface 52 side, the display device 301 can suppress the amount of the light that is directed toward the back surface side in the depth direction, that is, the amount of the light that is directed toward the first display surface 51 (the image display surface 3a) side. In this point also, while relatively increasing the amount of the light that is directed toward the front surface side in the depth direction from the second display surface 52 side, the display device 301 can suppress the amount of the light that is directed toward the back surface side in the depth direction, that is, the amount of the light that is directed toward the first display surface 51 side.

Then, the display device 301 can relatively increase the amount of the light that is directed toward the front surface side in the depth direction and suppress the amount of light that is directed toward the first display surface 51 side. Thus, on top of improving the visibility of the pattern 5c (the real image pattern 52a) in the display state of the second display surface 52, the display device 301 can suppress the amount of the light that is directed toward the first display surface 51 (the image display surface 3a) and reflected at the first display surface 51, and can thereby suppress the pattern 5c from being back-reflected on the first display surface 51. As a result, the display device 301 can suppress the pattern 5c of the second display surface 52 and an image of the pattern 5c that is back-reflected on the first display surface 51 from overlapping and being visually recognized as a double image, and thus can further improve the visibility of the pattern 5c in the display state of the second display surface 52.

In the display device 301, by defining the second groove-forming surface angle β=5°, the draft angle of a mold can be ensured at the time of resin-molding the transparent light guide plate 5a on which the grooves 5d are formed. Thus, the transparent light guide plate 5a can be molded, and the production efficiency can be relatively improved. In the display device 301, when the grooves 5d are formed on the principal surface of the transparent light guide plate 5a not by molding but by engraving in various methods such as laser beam machining, it is more preferable to make the value of the second groove-forming surface angle β smaller, for example, by making the second groove-forming surface angle β=0°, because the amount of the light that has entered again via the second groove forming surface 5db can be further increased due to the geometrical positional relation between the first groove forming surface 5da and the second groove forming surface 5db.

Furthermore, according to the display device 301 described in the foregoing, in the member on which the grooves 5d are formed, that is, in the transparent light guide plate 5a, the light not reflected at the grooves 5d out of the light that has entered from the incident end surface 5aa is emitted via the end surface 5ab. Thus, the light that has entered from the incident end surface 5aa, passed once through the portion in which the grooves 5d are formed, and reached the end surface 5ab can be suppressed from being reflected and propagating again toward the portion in which the grooves 5d are formed. As a result, the display device 301 can suppress the light that once passed through the portion on which the grooves 5d are formed from being propagated toward the portion on which the grooves 5d are formed and being emitted toward the back surface side in the depth direction, that is, toward the first display surface 51 (the image display surface 3a) side via the second groove forming surface 5db and the like. Thus, the display device 301 can further suppress the pattern 5c from being back-reflected on the first display surface 51. Accordingly, the display device 301 can improve the visibility of the pattern 5c in the display state of the second display surface 52 further reliably.

Then, the display device 301 described in the foregoing, as the same as the display device 1, when the light sources 5b are put out and the real image pattern 52a on the second display surface 52 constituted by the grooves 5d is made not to be displayed, can make the grooves 5d, which constitute the real image pattern 52a on the second display surface 52, hard to be visually recognized, and can suppress the visibility of the vehicle information displayed on the first display surface 51 from being disturbed.

On the display device 301 in the third embodiment also, the test the same as the luminance measurement test described with reference to FIGS. 13 to 19 was performed. In this case, in a cross-sectional view orthogonal to the extending direction L3, while being formed at a pitch of 0.5 μm as the same as in the foregoing, each of the grooves 5d was formed asymmetrical to the normal line NL as the center line of the surface on which the groove 5d is formed, and was made such that the first groove-forming surface angle α=45 deg, the second groove-forming surface angle β=5 deg, and the angle that the bottom portion forms is approximately 50 deg, and also the depth of each groove 5d in the depth direction was made to be 0.45 μm. FIG. 26 illustrates the result of the luminance measurement test. As is apparent from FIG. 26, in the display device 301, as the same as those of the display device 1, when the angle θ where the polarization direction L2 of the display 3 and the extending direction L3 of the grooves 5d form is within the range of 75°≤θ≤105°, for all the three colors of red, green, and blue, the luminance ratio of the area of the pattern 5c (the real image pattern 52a) to the area in the periphery of the pattern 5c is of 90% to 100%. Thus, it is apparent that, when the pattern 5c is made not to be displayed, the display device 301 can make the grooves 5d, which constitute the pattern 5c on the transparent light guide plate 5a, hard to be visually recognized. Moreover, in the display device 301, as the same as those of the display device 1, when the angle θ is within the range of 85°≤θ≤95°, for all the three colors of red, green, and blue, the luminance ratio of the area of the pattern 5c to the area in the periphery of the pattern 5c is of 92.5% to 100%. Thus, it is apparent that the display device 301 can make the grooves 5d harder to be visually recognized. Then, in the display device 301, as the same as those of the display device 1, when the angle θ is θ=90°, that is, when the polarization direction L2 and the extending direction L3 are orthogonal to each other, for all the three colors of red, green, and blue, the luminance ratio of the area of the pattern 5c to the area in the periphery of the pattern 5c is maximized. Thus, it is apparent that the display device 301 can make the grooves 5d hardest to be visually recognized. As in the foregoing, it is apparent that the display device 301 can ensure proper visibility, in addition to achieving a variety of display.

The shape of the groove 5d described in the third embodiment (the shape where the groove 5d is asymmetrical with respect to the normal line NL as the center line) may be applied to the grooves 266 of the display device 201 described in the second embodiment.

The display devices in the above-described embodiments of the present invention are not limited to those of the foregoing embodiments, and various modifications can be made within the scope stated in claims. The display device in the embodiments may be structured by combining the components of the foregoing respective embodiments and modifications as appropriate.

The display device in the embodiments can achieve a variety of display by combining the display of an image on the image display surface of the image display device, and the display of the pattern on the transparent light guide plate of the superimposing display device that is provided overlapping the image display surface. Then, the display device is structured such that the polarization direction of the image display device and the extending direction of the grooves intersect at a certain angle range. Thus, when the pattern on the transparent light guide plate is made not to be displayed, the luminance ratio that represents the ratio of the luminance of the area of the pattern to the luminance of the area in the periphery of the pattern in the transparent light guide plate can be made relatively large. Accordingly, when the light sources are put out and the pattern on the transparent light guide plate constituted by the fine grooves is made not to be displayed, the display device can make the grooves, which constitute the pattern on the transparent light guide plate, hard to be visually recognized, and can suppress the visibility of the image displayed on the image display surface of the image display device from being disturbed. As a result, the display device has an effect in that, in addition to achieving a variety of display, proper visibility can be ensured, for example.

The display device in the embodiments can display information by combining the vehicle information that is displayed on the first display surface by the light emitted from the main light source, and the pattern that is displayed on the second display surface that is provided overlapping the first display surface and transmits light and that is switched between the display and non-display on the basis of the lighting and non-lighting of the light source for the grooves. Then, the display device is structured such that the polarization direction of the light emitted from the main light source and polarized by the polarizing plate and the extending direction of the grooves constituting the pattern intersect at a certain angle range. Thus, when the pattern is made not to be displayed, the luminance ratio that represents the ratio of the luminance of the area of the pattern to the luminance of the area in the periphery of the pattern in the second display surface can be made relatively large. Accordingly, when the light source for grooves is put out and the pattern on the second display surface constituted by the grooves is made not to be displayed, the display device can make the grooves, which constitute the pattern on the second display surface, hard to be visually recognized, and can suppress the visibility of the vehicle information displayed on the first display surface from being disturbed. As a result, the display device has an effect in that, in addition to achieving a variety of display, proper visibility can be ensured, for example.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
    an image display device that includes an image display surface that is configured to display an image by light emitted from a main light source; and
    a superimposing display device that includes a transparent light guide plate that is configured to be provided overlapping the image display surface, transmit light emitted from the image display surface, and have grooves constituting a pattern formed thereon, includes a light source for grooves that irradiate an end surface of the transparent light guide plate with light, and is switched between display and non-display of the pattern based on lighting and non-lighting of the light source for grooves, wherein
    the image display device polarizes light incident on the transparent light guide plate from the image display surface in one polarization direction,
    the polarization direction of the image display device and an extending direction of the grooves intersect at an angle range of 75° to 105°, and
    the superimposing display device is configured to transmit substantially same amount of the light emitted from the image display surface at the pattern and at groove-free portions of the superimposing display device outside the pattern by having the polarization direction of the image display device and the extending direction of the grooves intersect at the angle range of 75° to 105°.

2. The display device according to claim 1, wherein the polarization direction of the image display device and the extending direction of the grooves are orthogonal to each other.

3. The display device according to claim 1, wherein the extending direction of the grooves and an irradiation direction of light by the light source for grooves are orthogonal to each other.

4. The display device according to claim 2, wherein the extending direction of the grooves and an irradiation direction of light by the light source for grooves are orthogonal to each other.

5. The display device according to claim 3, wherein
    the polarization direction of the image display device and the irradiation direction of the light by the light source for grooves are directions along a vertical direction,
    the extending direction of the grooves is a direction along a horizontal direction,
    the transparent light guide plate is formed such that a length in the horizontal direction is larger than a length in the vertical direction, and
    the light source for grooves is arranged on a lower side in the vertical direction of the transparent light guide plate or on an upper side in the vertical direction of the transparent light guide plate.

6. The display device according to claim 1, wherein
    the image display device includes a first display surface that constitutes the image display surface and displays the image concerning vehicle information by light emitted from the main light source and a polarizing plate that is configured to polarize light into light polarized in one direction,
    the superimposing display device includes a second display surface that is provided overlapping the first display surface and transmits light, and has the grooves constituting the pattern formed thereon and is capable of switching between a display state of displaying the pattern by the light emitted from the light source for grooves and a non-display state of not displaying the pattern by putting out the light source for grooves,
    the polarizing plate is provided between the main light source and the second display surface and changes light emitted toward the second display surface from the main light source into light polarized in one direction, and
    the polarization direction of the light polarized by the polarizing plate and the extending direction of the grooves intersect at the angle range of 75° to 105°.

7. The display device according to claim 2, wherein
    the image display device includes a first display surface that constitutes the image display surface and displays the image concerning vehicle information by light emitted from the main light source and a polarizing plate that is configured to polarize light into light polarized in one direction,
    the superimposing display device includes a second display surface that is provided overlapping the first display surface and transmits light, and has the grooves constituting the pattern formed thereon and is capable of switching between a display state of displaying the pattern by the light emitted from the light source for grooves and a non-display state of not displaying the pattern by putting out the light source for grooves,
    the polarizing plate is provided between the main light source and the second display surface and changes light emitted toward the second display surface from the main light source into light polarized in one direction, and
    the polarization direction of the light polarized by the polarizing plate and the extending direction of the grooves intersect at the angle range of 75° to 105°.

8. The display device according to claim 3, wherein
    the image display device includes a first display surface that constitutes the image display surface and displays the image concerning vehicle information by light emitted from the main light source and a polarizing plate that is configured to polarize light into light polarized in one direction,
    the superimposing display device includes a second display surface that is provided overlapping the first display surface and transmits light, and has the grooves constituting the pattern formed thereon and is capable of switching between a display state of displaying the pattern by the light emitted from the light source for grooves and a non-display state of not displaying the pattern by putting out the light source for grooves,
    the polarizing plate is provided between the main light source and the second display surface and changes light emitted toward the second display surface from the main light source into light polarized in one direction, and the polarization direction of the light polarized by the polarizing plate and the extending direction of the grooves intersect at the angle range of 75° to 105°.

9. The display device according to claim 5, wherein
the image display device includes a first display surface that constitutes the image display surface and displays the image concerning vehicle information by light emitted from the main light source and a polarizing plate that is configured to polarize light into light polarized in one direction,
the superimposing display device includes a second display surface that is provided overlapping the first display surface and transmits light, and has the grooves constituting the pattern formed thereon and is capable of switching between a display state of displaying the pattern by the light emitted from the light source for grooves and a non-display state of not displaying the pattern by putting out the light source for grooves,
the polarizing plate is provided between the main light source and the second display surface and changes light emitted toward the second display surface from the main light source into light polarized in one direction, and
the polarization direction of the light polarized by the polarizing plate and the extending direction of the grooves intersect at the angle range of 75° to 105°.

10. A display device comprising:
a first display surface that displays vehicle information by light emitted from a main light source;
a second display surface that is configured to be provided overlapping the first display surface and transmit light, and have grooves constituting a pattern formed thereon and is capable of switching between a display state of displaying the pattern by light emitted from a light source for grooves and a non-display state of not displaying the pattern by putting out the light source for grooves; and
a polarizing plate that is provided between the main light source and the second display surface and is configured to change light emitted toward the second display surface from the main light source into light polarized in one direction, wherein
a polarization direction of the light polarized by the polarizing plate and an extending direction of the grooves intersect at an angle range of 75° to 105°, and
the second display surface is configured to transmit substantially same amount of the light emitted from the first display surface at the pattern and at groove-free portions of the second display surface outside the pattern by having the polarization direction of the light polarized by the polarizing plate and the extending direction of the grooves intersect at the angle range of 75° to 105°.

11. The display device according to claim 10, wherein
the polarization direction of the light polarized by the polarizing plate and the extending direction of the grooves are orthogonal to each other.

12. The display device according to claim 1, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the image display surface,
and when an angle, in a cross-sectional view orthogonal to the extending direction, that is formed by a normal line of the surface, on which the groove is formed, and the first groove forming surface and located on the image display surface side and an opposite side of the second groove forming surface side is defined as a first groove-forming surface angle, and when an angle, in the cross-sectional view orthogonal to the extending direction, that is formed by the normal line and the second groove forming surface and located on the image display surface side and the opposite side of the first groove forming surface side is defined as a second groove-forming surface angle, the first groove-forming surface angle is greater than the second groove-forming surface angle.

13. The display device according to claim 2, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the image display surface,
and when an angle, in a cross-sectional view orthogonal to the extending direction, that is formed by a normal line of the surface, on which the groove is formed, and the first groove forming surface and located on the image display surface side and an opposite side of the second groove forming surface side is defined as a first groove-forming surface angle, and when an angle, in the cross-sectional view orthogonal to the extending direction, that is formed by the normal line and the second groove forming surface and located on the image display surface side and the opposite side of the first groove forming surface side is defined as a second groove-forming surface angle, the first groove-forming surface angle is greater than the second groove-forming surface angle.

14. The display device according to claim 3, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the image display surface,
and when an angle, in a cross-sectional view orthogonal to the extending direction, that is formed by a normal line of the surface, on which the groove is formed, and the first groove forming surface and located on the image display surface side and an opposite side of the second groove forming surface side is defined as a first groove-forming surface angle, and when an angle, in the cross-sectional view orthogonal to the extending direction, that is formed by the normal line and the second groove forming surface and located on the image display surface side and the opposite side of the first groove forming surface side is defined as a second groove-forming surface angle, the first groove-forming surface angle is greater than the second groove-forming surface angle.

15. The display device according to claim 5, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the image display surface,
and when an angle, in a cross-sectional view orthogonal to the extending direction, that is formed by a normal line of the surface, on which the groove is formed, and the first groove forming surface and located on the image display surface side and an opposite side of the second groove forming surface side is defined as a first groove-forming surface angle, and when an angle, in the cross-sectional view orthogonal to the extending direction, that is formed by the normal line and the second groove forming surface and located on the image display surface side and the opposite side of the first groove forming surface side is defined as a second groove-forming surface angle, the first groove-forming surface angle is greater than the second groove-forming surface angle.

16. The display device according to claim 6, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the first display surface,
and when an angle, in a cross-sectional view orthogonal to the extending direction, that is formed by a normal line of the surface, on which the groove is formed, and the first groove forming surface and located on the first display surface side and an opposite side of the second groove forming surface side is defined as a first groove-forming surface angle, and when an angle, in the cross-sectional view orthogonal to the extending direction, that is formed by the normal line and the second groove forming surface and located on the first display surface side and the opposite side of the first groove forming surface side is defined as a second groove-forming surface angle, the first groove-forming surface angle is greater than the second groove-forming surface angle.

17. The display device according to claim 10, wherein
the grooves each have a bottom portion forming an angle by a first groove forming surface that lies along the extending direction and a second groove forming surface that lies along the extending direction and is connected to the first groove forming surface,
the light source for grooves is located on the first groove forming surface side,
a surface on which the grooves are formed is opposite to the first display surface,
and when an angle, in a cross-sectional view orthogonal to the extending direction, that is formed by a normal line of the surface, on which the groove is formed, and the first groove forming surface and located on the first display surface side and an opposite side of the second groove forming surface side is defined as a first groove-forming surface angle, and when an angle, in the cross-sectional view orthogonal to the extending direction, that is formed by the normal line and the second groove forming surface and located on the first display surface side and the opposite side of the first groove forming surface side is defined as a second groove-forming surface angle, the first groove-forming surface angle is greater than the second groove-forming surface angle.

18. The display device according to claim 1, wherein
a value of a luminance ratio represented by a ratio of a luminance of the light emitted from the image display surface transmitted at the pattern to a luminance of the light emitted from the image display surface transmitted at a portion of a periphery of the pattern is equal to or larger than a predetermined value, making the pattern hardly noticeable against the portion of the periphery of the pattern in the transparent light guide plate upon non-lighting of the light source for grooves.

* * * * *